US011272110B2

(12) United States Patent
Tanaka et al.

(10) Patent No.: US 11,272,110 B2
(45) Date of Patent: Mar. 8, 2022

(54) IMAGING APPARATUS AND IMAGE PROCESSING METHOD

(71) Applicant: SONY CORPORATION, Tokyo (JP)

(72) Inventors: Yasuhito Tanaka, Kanagawa (JP); Yohei Hamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/177,803

(22) Filed: Feb. 17, 2021

(65) Prior Publication Data

US 2021/0168291 A1   Jun. 3, 2021

Related U.S. Application Data

(63) Continuation of application No. 16/495,258, filed as application No. PCT/JP2018/001784 on Jan. 22, 2018, now Pat. No. 10,951,828.

(30) Foreign Application Priority Data

Mar. 30, 2017   (JP) ................................ 2017-067662

(51) Int. Cl.
  *H04N 5/232*   (2006.01)
  *H04N 5/77*    (2006.01)
  *H04N 5/91*    (2006.01)

(52) U.S. Cl.
  CPC ......... *H04N 5/23293* (2013.01); *H04N 5/772* (2013.01); *H04N 5/91* (2013.01)

(58) Field of Classification Search
  None
  See application file for complete search history.

(56) References Cited

U.S. PATENT DOCUMENTS

| | | | |
|---|---|---|---|
| 6,614,945 B1* | 9/2003 | Takaoka | H04N 1/387 382/274 |
| 2015/0146051 A1 | 5/2015 | Abe et al. | |
| 2017/0230583 A1* | 8/2017 | Kudo | H04N 5/2353 |

FOREIGN PATENT DOCUMENTS

| | | |
|---|---|---|
| JP | 2010-273182 A | 12/2010 |
| WO | 2013/190762 A1 | 12/2013 |

OTHER PUBLICATIONS

International Search Report and Written Opinion of PCT Application No. PCT/JP2018/001784, dated Mar. 13, 2018, 7 pages of English Translation and 6 pages of ISRWO.

(Continued)

*Primary Examiner* — James M Hannett
(74) *Attorney, Agent, or Firm* — Chip Law Group

(57) ABSTRACT

Provided is an apparatus and method that perform display control to avoid a blackout of a display unit at the time of capturing an image for recording. The apparatus includes an imaging element, a frame memory, a display unit, and a control unit, and the control unit starts exposure preparation processing of the image for recording in response to input detection of image-capturing operation on the imaging apparatus, and executes exposure processing of the image for recording in the imaging element and storage processing of the image for recording in the frame memory after completion of the exposure preparation processing. Moreover, the control unit stops exposure of an image for displaying of the imaging element with the start of the exposure preparation processing, and displays the image for displaying on the display unit until display of the image for recording is enabled, to avoid the blackout.

10 Claims, 12 Drawing Sheets

(56) References Cited

OTHER PUBLICATIONS

Non-Final Office Action for U.S. Appl. No. 16/495,258, dated Jul. 14, 2020, 7 pages.
Notice of Allowance for U.S. Appl. No. 16/495,258, dated Nov. 16, 2020, 7 pages.
International Preliminary Report on Patentability of PCT Application No. PCT/JP2018/001784, dated Oct. 10, 2019, 8 pages of English Translation and 4 pages of IPRP.
Office Action for JP Patent Application No. 2019-508609, dated Oct. 12, 2021, 03 pages of English Translation and 03 pages of Office Action.

* cited by examiner

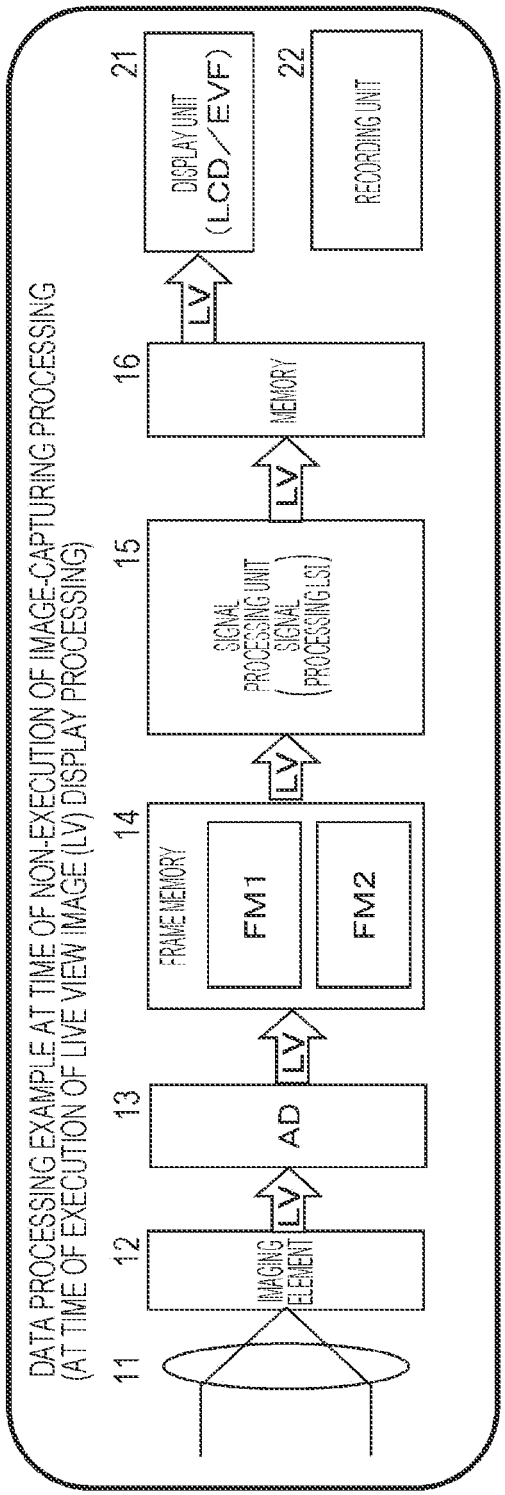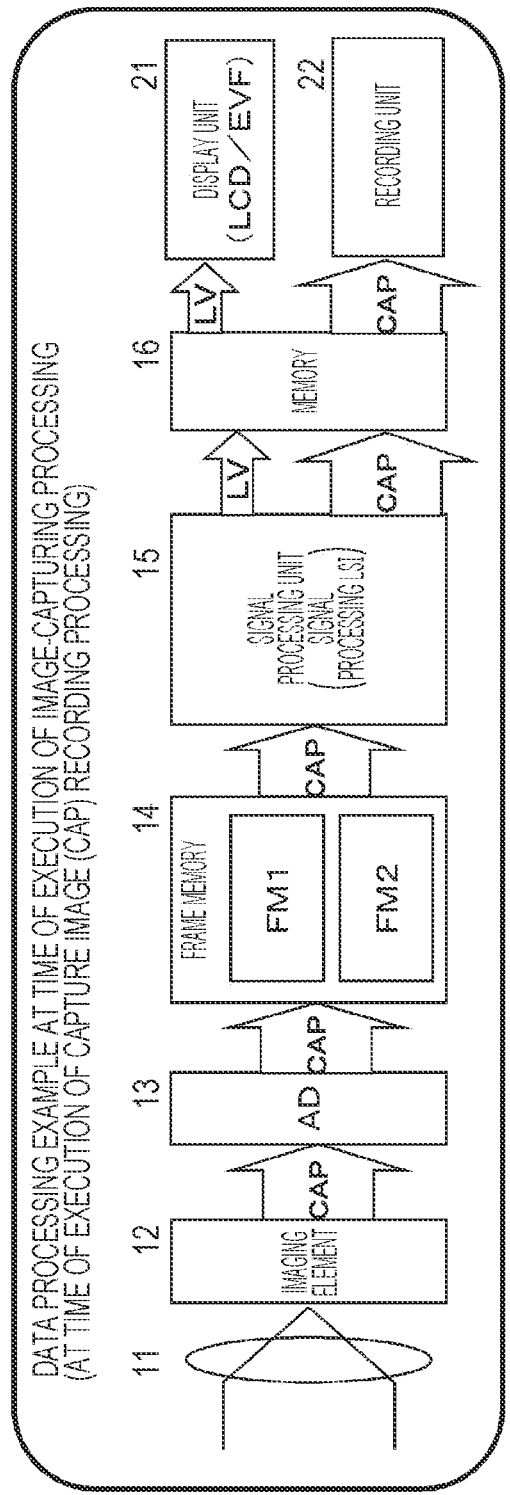

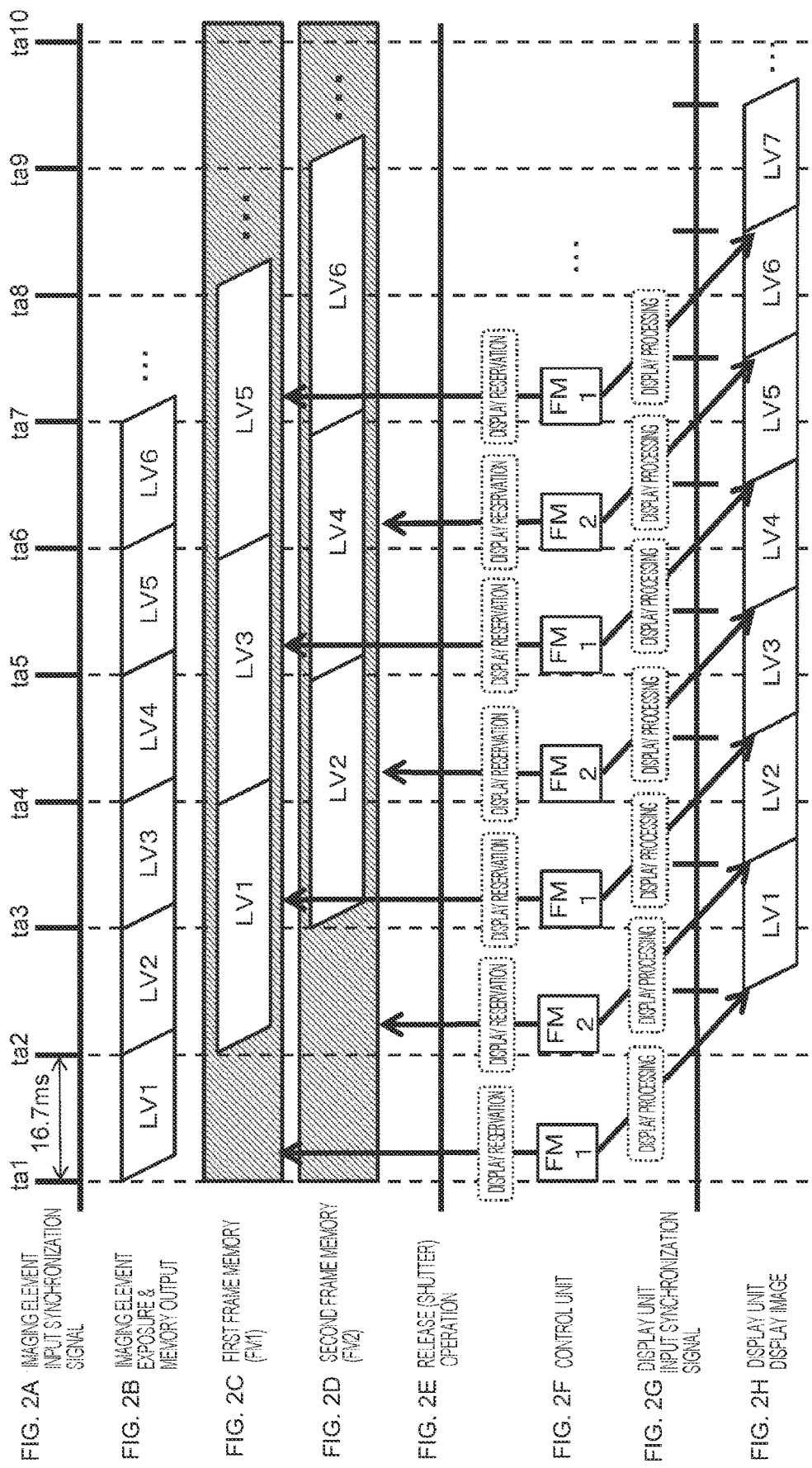

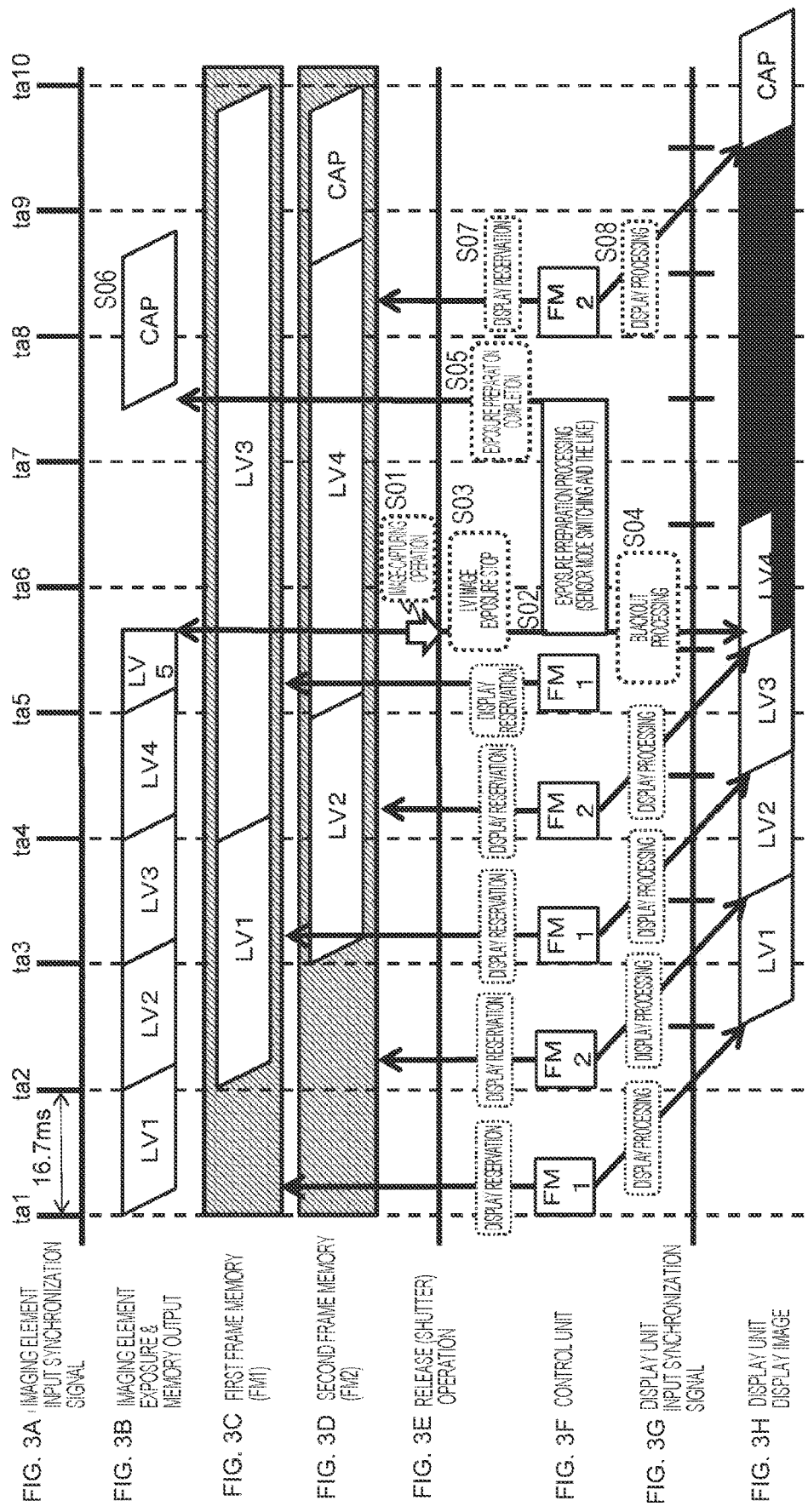

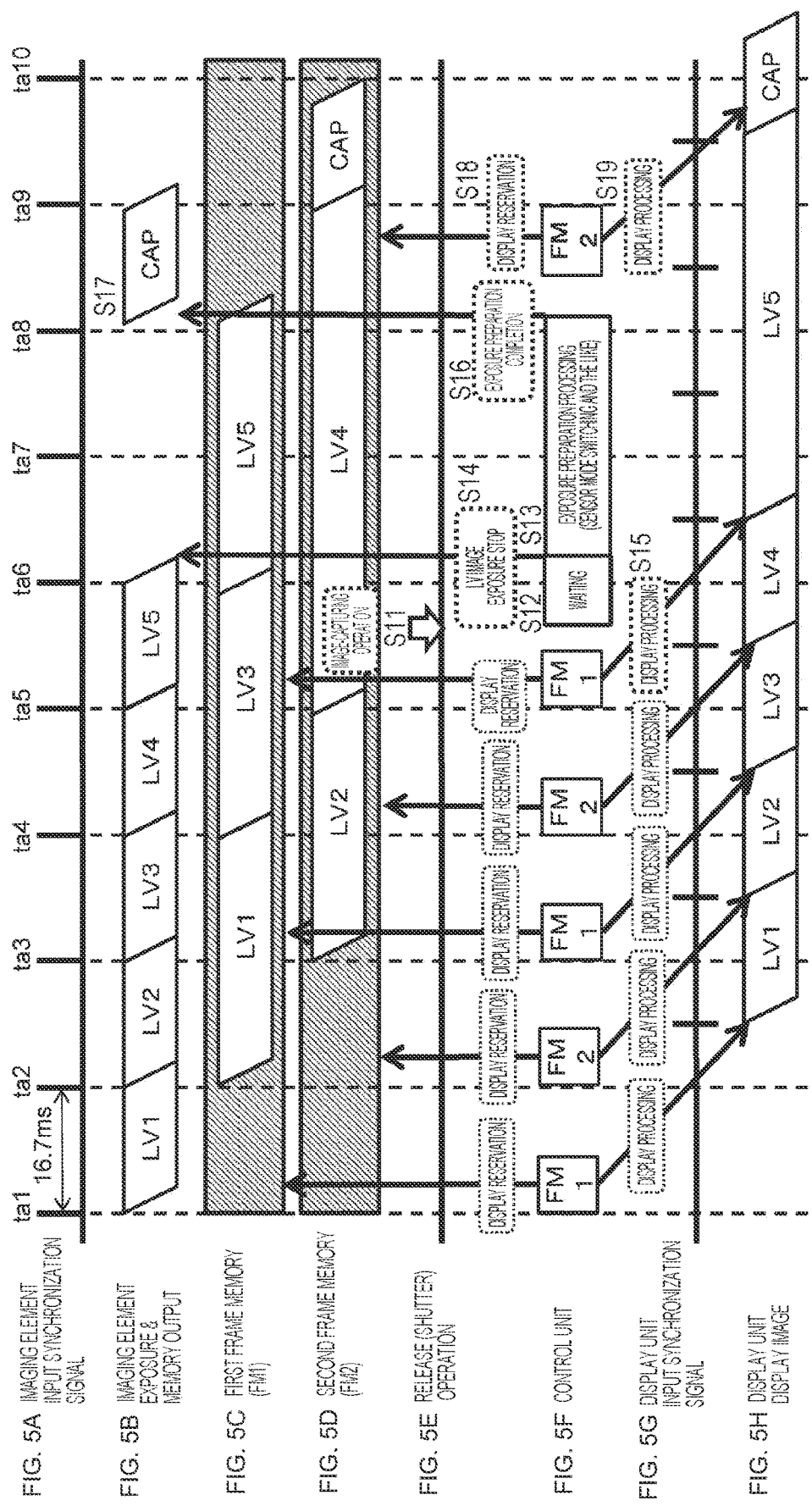

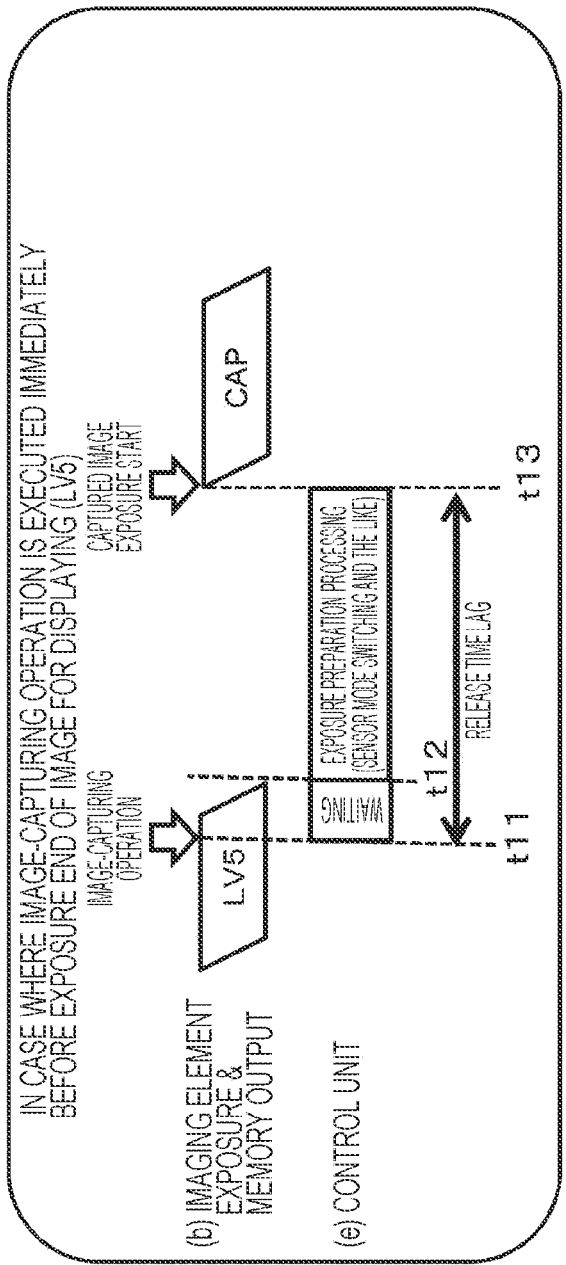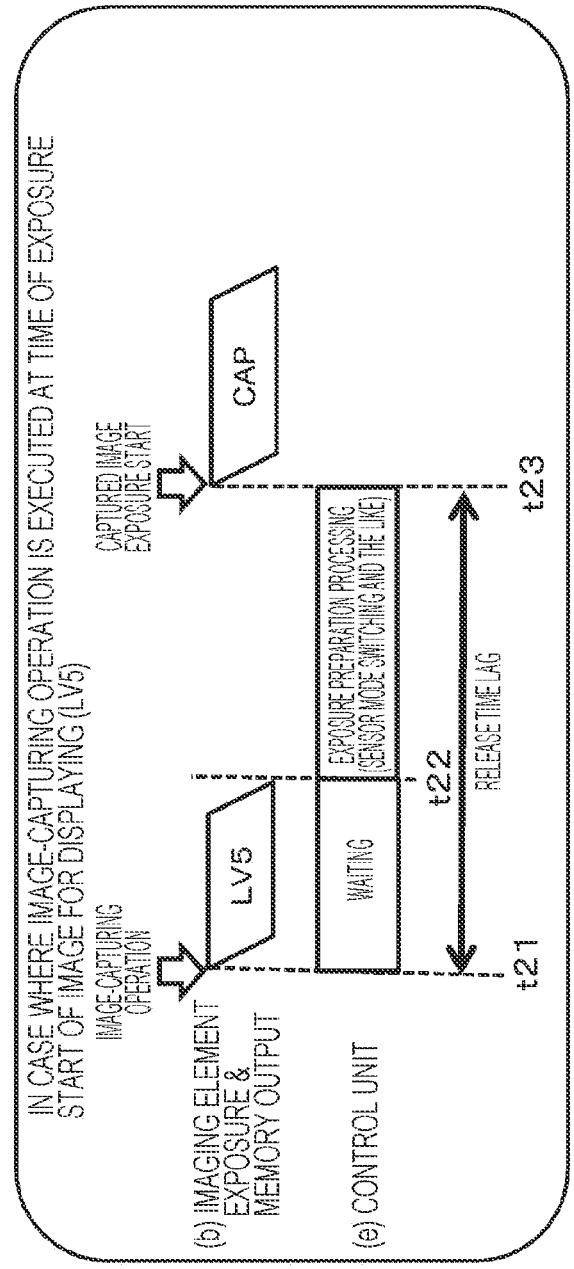
FIG. 6A
FIG. 6B

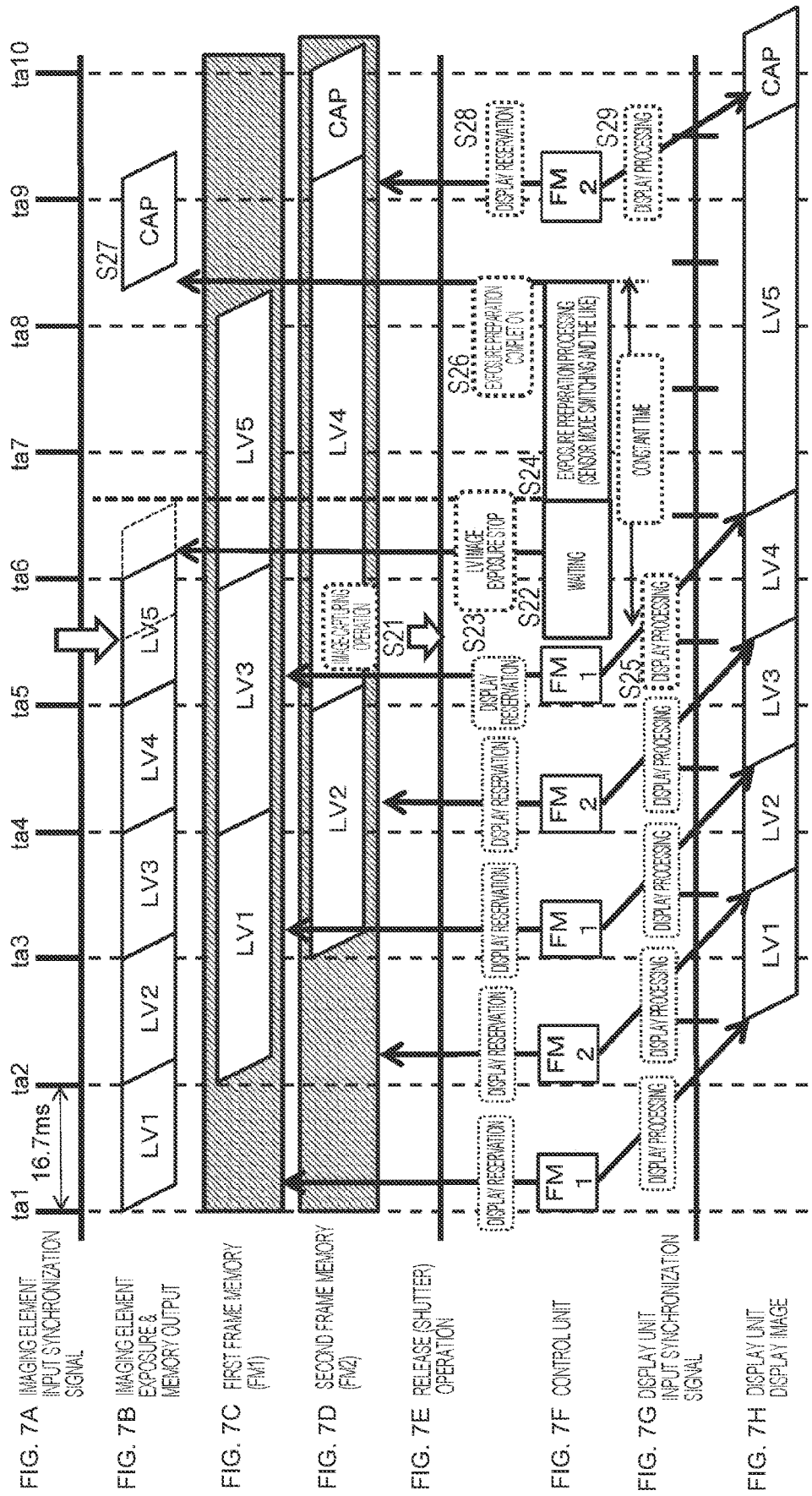

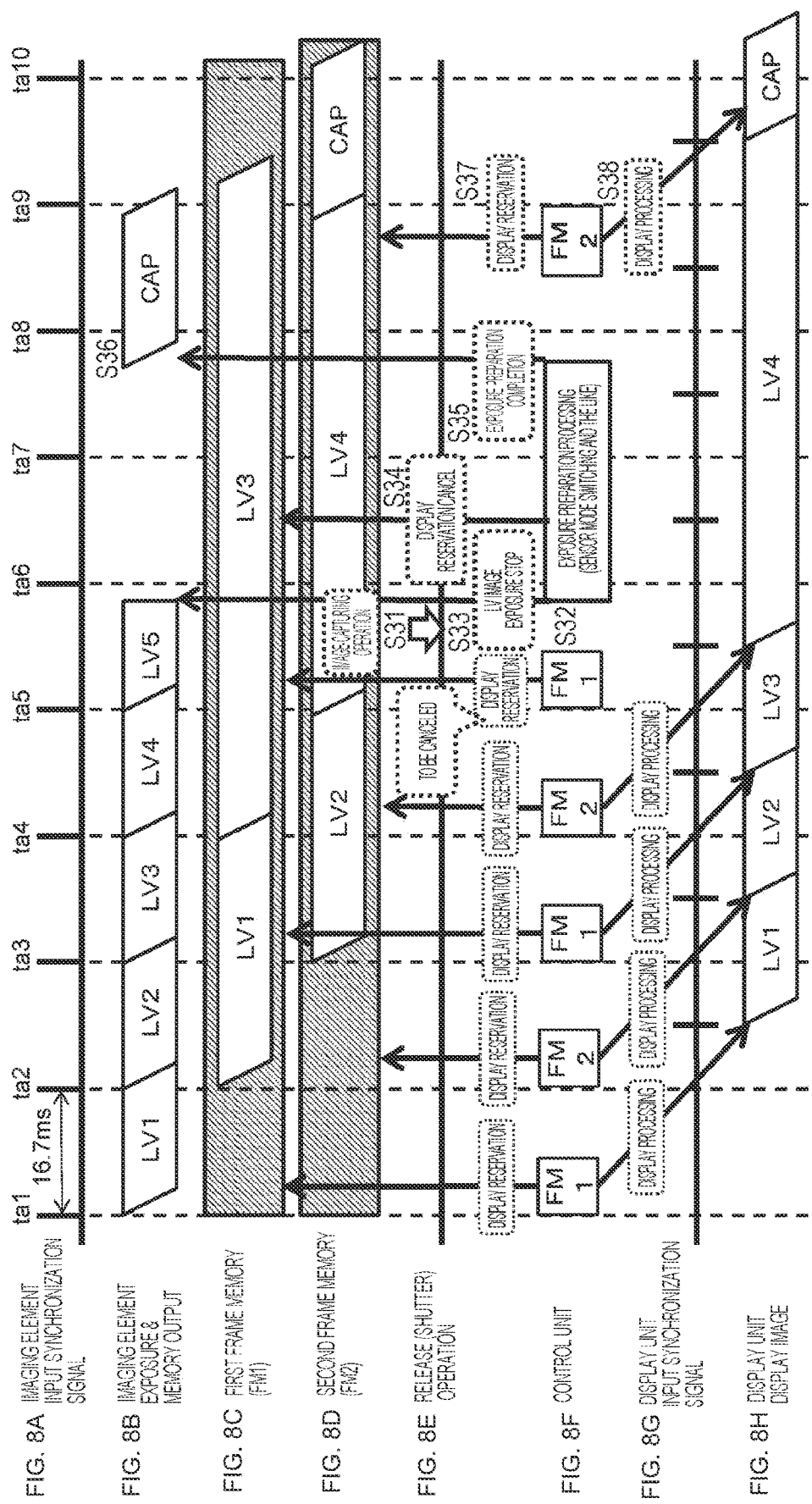

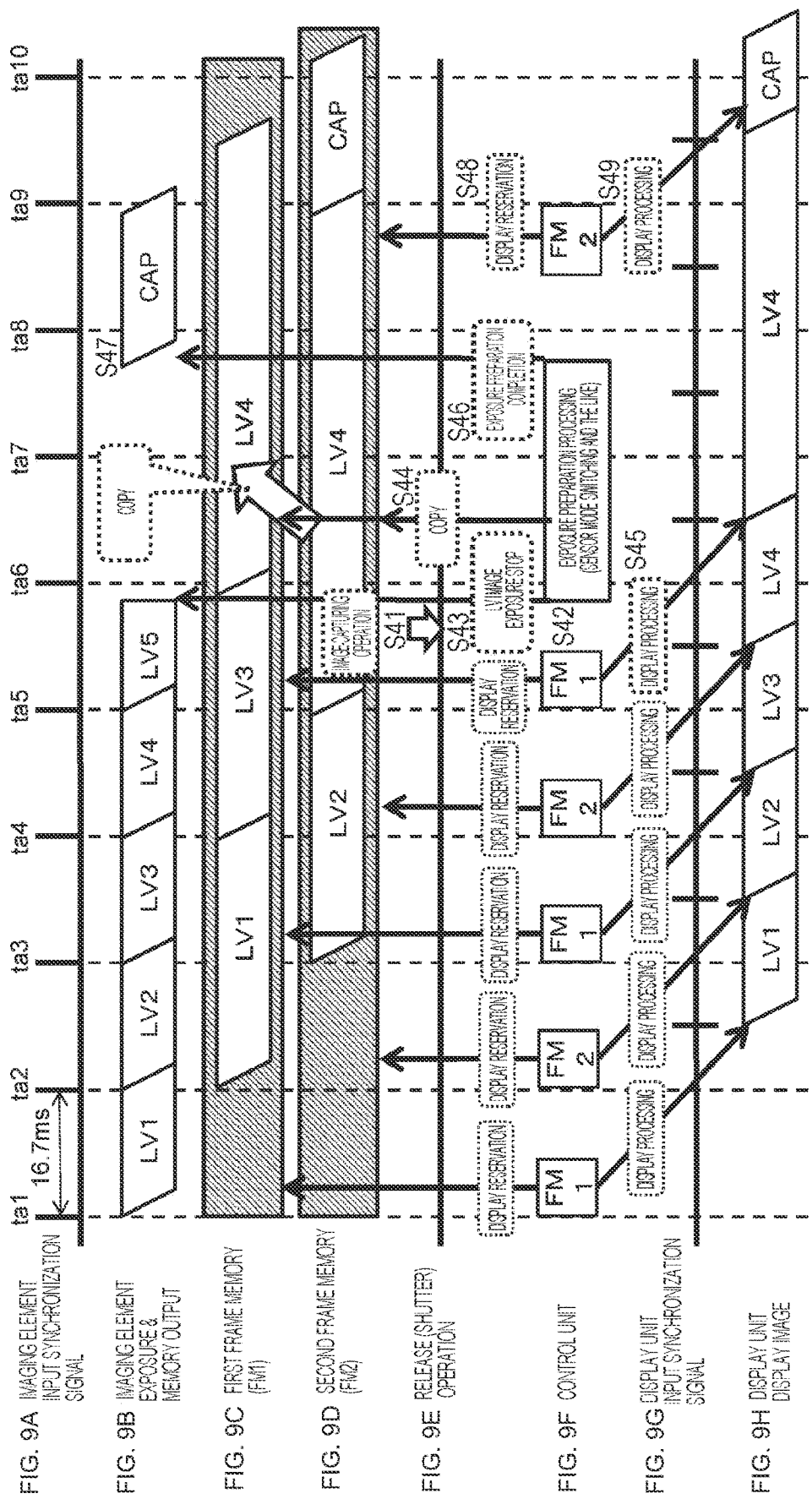

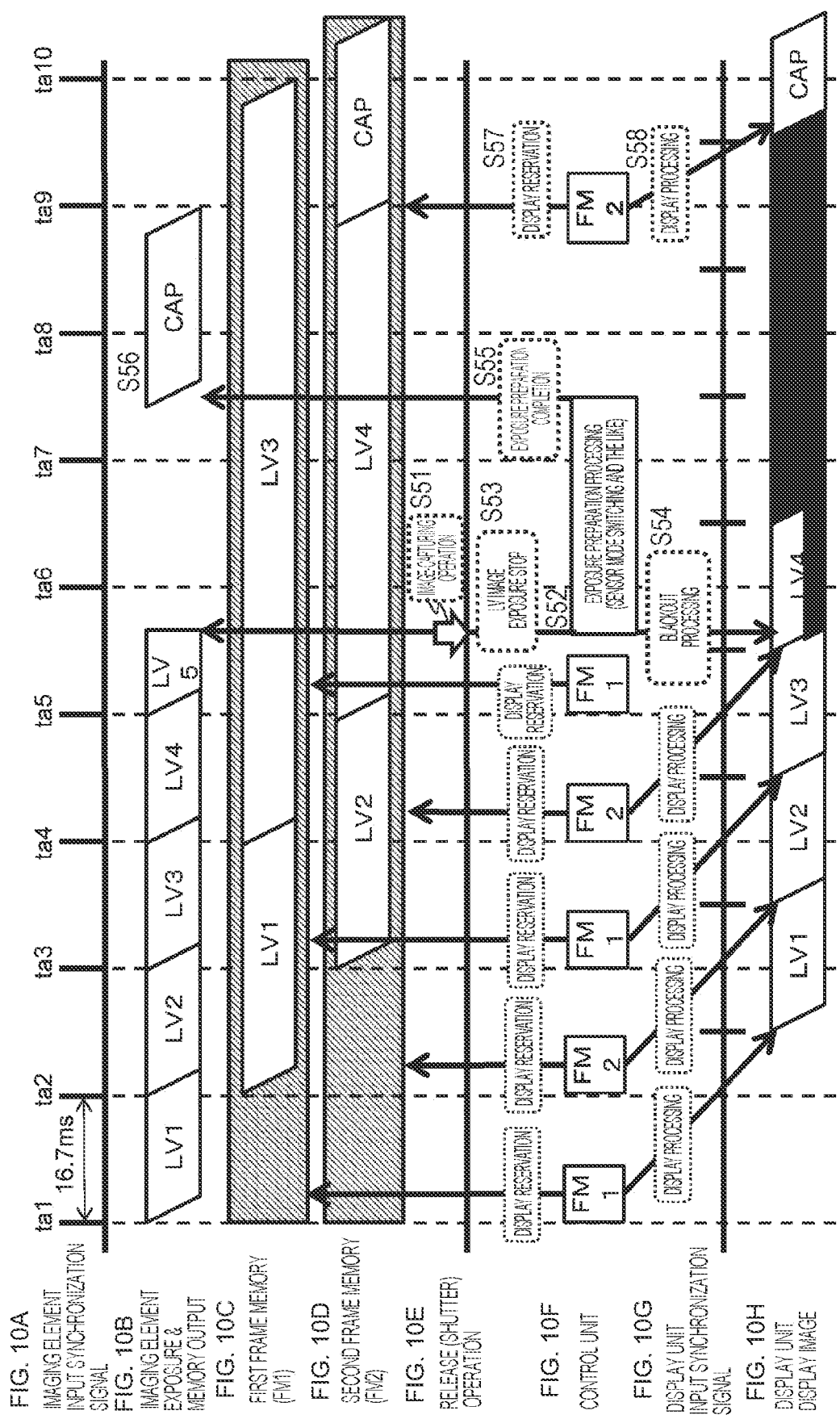

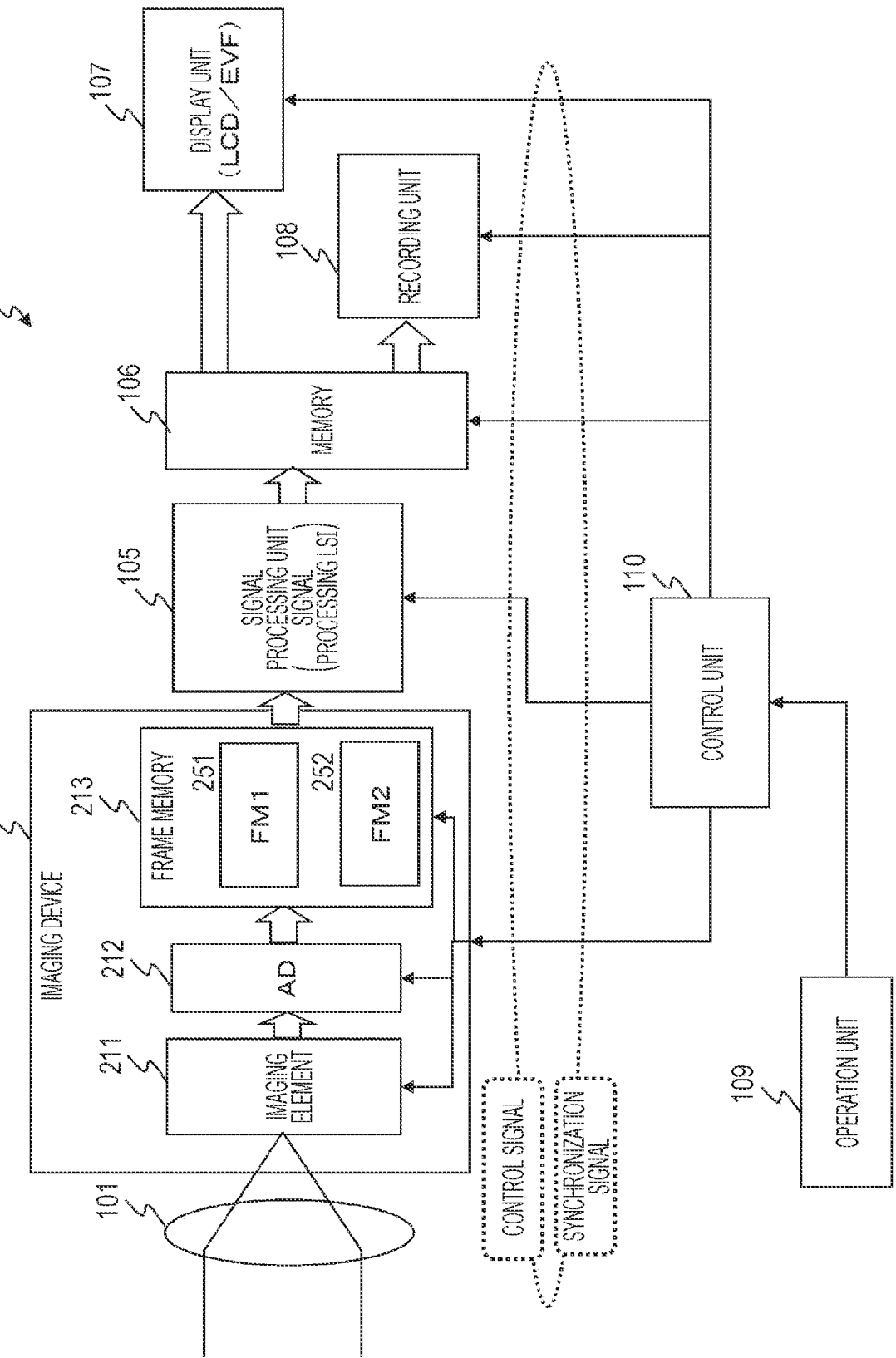

IMAGING APPARATUS AND IMAGE PROCESSING METHOD

CROSS-REFERENCES TO RELATED APPLICATIONS

The present application is a continuation application of U.S. patent application Ser. No. 16/495,258, filed on Sep. 18, 2019, which is a National Stage Entry of PCT/JP2018/001784 filed on Jan. 22, 2018, which claims priority benefit of Japanese Patent Application Nfvo. JP 2017-067662, filed in the Japan Patent Office on Mar. 30, 2017. Each of the above-referenced applications is hereby incorporated herein by reference in its entirety.

TECHNICAL FIELD

The present disclosure relates to an imaging apparatus, an image processing method, and a program. In particular, the present disclosure relates to an imaging apparatus, an image processing method, and a program that perform display image control of a display unit of the imaging apparatus.

BACKGROUND ART

In a case where image capturing is performed by using a camera (imaging apparatus), many users (image-capturing persons) confirm an image displayed on a display unit such as an LCD display unit or an electric view finder (EVF) of the camera.

For example, the user (image-capturing person) can determine an image-capturing timing by observing the image displayed on the display unit, and press a release button (shutter button).

Furthermore, the user (image-capturing person) can display the captured image on the display unit and confirm the captured image.

In a case where image capturing is not performed, a current image incident on an imaging element of the imaging apparatus, in other words, a live view image (LV image) is displayed on the display unit of the imaging apparatus. The live view image (LV image) is also referred to as a through image, and the user (image-capturing person) can determine the image-capturing timing by confirming the live view image (LV image) displayed on the display unit.

In a case where the user (image-capturing person) performs image-capturing processing, the release button (shutter button) is pressed. Along with this release button operation processing, exposure preparation processing is started, for example, mode switching of the imaging element, or the like.

However, in many imaging apparatuses, imaging is stopped of the live view image (LV image) of the imaging element due to the start of the exposure preparation processing, and as a result, a period occurs in which nothing is displayed on the display unit. A so-called blackout of the display unit occurs. Note that, the blackout of the display unit is described, for example, in Patent Document 1 (Japanese Patent Application Laid-Open No. 2015-186234).

When the blackout occurs, the user (image-capturing person) cannot confirm the display image.

Furthermore, there is a possibility that problems occur such as user's discomfort, or misunderstanding that operation mistake has been performed due to an influence of the blackout of the display unit generated with pressing of the release button.

CITATION LIST

Patent Document

Patent Document 1: Japanese Patent Application Laid-Open No. 2008-186234

SUMMARY OF THE INVENTION

Problems to be Solved by the Invention

The present disclosure has been made, for example, in view of the above problems, and it is an object to provide an imaging apparatus, an image processing method, and a program enabled to prevent occurrence of problems such as user's discomfort, or misunderstanding that operation mistake has been performed due to the blackout of the display unit generated with pressing of the release button.

Solutions to Problems

A first aspect of the present disclosure is in
an imaging apparatus including:
an imaging element;
a frame memory that stores an image for displaying acquired by the imaging element;
a display unit that displays the image for displaying stored by the frame memory; and
a control unit that starts exposure preparation processing of an image for recording in response to input detection of imaging operation, and performs display control to cause the display unit to display the image for displaying having been stored in the frame memory until display of the image for recording is enabled.

Moreover, a second aspect of the present disclosure is in an image processing method to be executed in an imaging apparatus,
the imaging apparatus including
an imaging element,
a frame memory that stores an acquired image by the imaging element,
a display unit that displays a stored image of the frame memory, and
a control unit that performs control of processing to be executed in the imaging apparatus,
the image processing method including
by the control unit, starting exposure preparation processing of an image for recording in response to input detection of image-capturing operation, and performing display control to cause the display unit to display an image for displaying having been stored in the frame memory unit until display of the image for recording is enabled.

Moreover, a third aspect of the present disclosure is in
a program that causes an imaging apparatus to execute image processing,
the imaging apparatus including
an imaging element,
a frame memory that stores an acquired image by the imaging element,
a display unit that displays a stored image of the frame memory, and
a control unit that performs control of processing to be executed in the imaging apparatus,
the program causing the control unit to
start exposure preparation processing of an image for recording in response to input detection of imaging operation, and perform display control to cause the display unit to display the image for displaying having been stored in the frame memory until display of the image for recording is enabled.

Note that, the program of the present disclosure is, for example, a program that can be provided by a communication medium or a storage medium provided in a computer readable form to a computer system or an information processing device that can execute various program codes. By providing such a program in a computer readable form, processing is implemented according to the program on the information processing device or the computer system.

Still other objects, features and advantages of the present disclosure will become apparent from the detailed description based on embodiments of the present disclosure and attached drawings to be described later. Note that, in this specification, the term "system" refers to a logical group configuration of a plurality of devices, and is not limited to a system in which the devices of respective configurations are in the same housing.

Effects of the Invention

According to a configuration of an embodiment of the present disclosure, an apparatus and a method are implemented that perform display control to avoid the blackout of the display unit at the time of capturing an image for recording.

Specifically, for example, the apparatus includes an imaging element, a frame memory, a display unit, and a control unit, and the control unit starts exposure preparation processing of an image for recording in response to input detection of image-capturing operation on the imaging apparatus, and executes exposure processing of the image for recording in the imaging element and storage processing of the image for recording in the frame memory after completion of the exposure preparation processing. Moreover, the control unit stops exposure of an image for displaying of the imaging element with the start of the exposure preparation processing, and displays the image for displaying on the display unit until display of the image for recording is enabled, to avoid the blackout.

With these pieces of processing, the apparatus and the method are implemented that perform display control to avoid the blackout of the display unit at the time of capturing the image for recording.

Note that, the advantageous effects described in this specification are merely examples, and the advantageous effects of the present technology are not limited to them and may include additional effects.

BRIEF DESCRIPTION OF DRAWINGS

FIGS. 1A and 1B are diagrams illustrating a data processing sequence in capturing and display processing of an image in an imaging apparatus.

FIGS. 2A, 2B, 2C, 2D, 2E, 2F, 2G, and 2H are diagrams illustrating a timing chart illustrating a processing sequence in a case where an image for displaying (LV image) is displayed on a display unit of the imaging apparatus.

FIGS. 3A, 3B, 3C, 3D, 3E, 3F, 3G, and 3H are diagrams illustrating a timing chart illustrating a processing sequence in a case where the image for displaying (LV image) is displayed on the display unit of the imaging apparatus, and during the display, image-capturing processing is performed, and recording processing of an image for recording (CAP image) is performed.

FIGS. 5A, 5B, 5C, 5D, 5E, 5F, 5G, and 5H are diagrams illustrating a processing sequence according to a first embodiment.

FIGS. 6A and 6B are diagrams illustrating a problem that a release time lag changes depending on timing of image-capturing operation.

FIGS. 7A, 7B, 7C, 7D, 7E, 7F, 7G, and 7H are diagrams illustrating a processing sequence according to a second embodiment.

FIGS. 8A, 8B, 8C, 8D, 8E, 8F, 8G, and 8H are diagrams illustrating a processing sequence according to a third embodiment.

FIGS. 9A, 9B, 9C, 9D, 9E, 9F, 9G, and 9H are diagrams illustrating a processing sequence according to a fourth embodiment.

FIGS. 10A, 10B, 10C, 10D, 10E, 10F, 10G, and 10H are diagrams illustrating a processing sequence according to a fifth embodiment.

FIG. 12 is a diagram illustrating a configuration example of the imaging apparatus.

MODE FOR CARRYING OUT THE INVENTION

Figure 4:
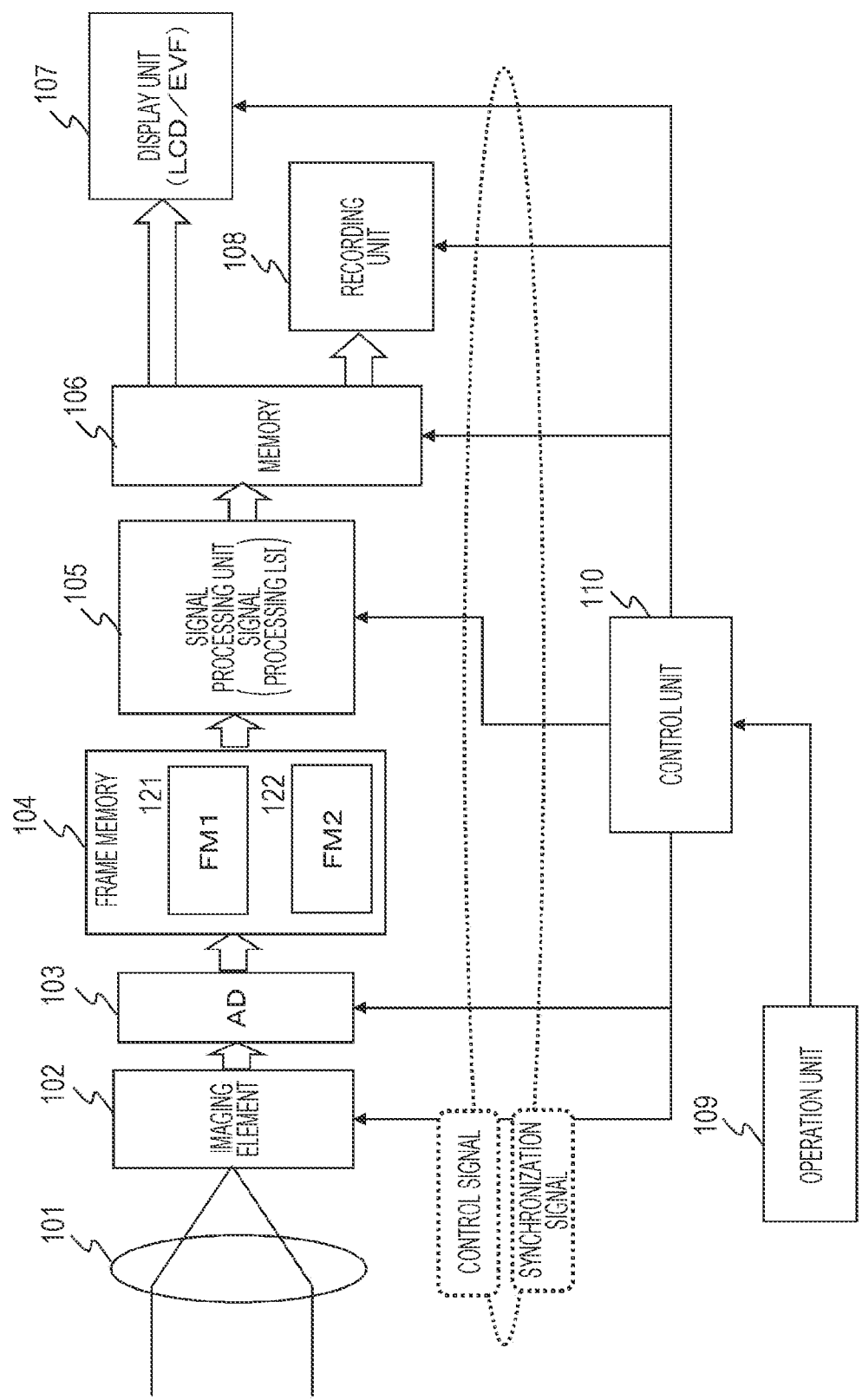
FIG. 4 is a diagram illustrating a configuration example of the imaging apparatus.

Hereinafter, with reference to the drawings, details will be described of an imaging apparatus, an image processing method, and a program of the present disclosure. Note that, the description will be made in accordance with the following items.
1. Overview of capturing and display processing of image in imaging apparatus
2. Configuration example of imaging apparatus of the present disclosure
3. Embodiments of imaging apparatus in which blackout of display unit is prevented
3-1. (First embodiment) Embodiment in which blackout of display unit is prevented by starting exposure preparation processing after completion of exposure of image for displaying
3-2. (Second embodiment) Embodiment in which blackout of display unit is prevented by starting exposure preparation processing after lapse of waiting time for making release time lag constant after completion of exposure of image for displaying
3-3. (Third embodiment) Embodiment in which blackout of display unit is prevented by canceling display reservation of unexposed image and performing continuous display of display image of display unit
3-4. (Fourth embodiment) Embodiment in which blackout of display unit is prevented by continuously displaying the same image on display unit even after memory switching, by performing inter frame memory copy of latest image having been stored in frame memory
4. (Fifth embodiment) Embodiment in which it is determined whether or not period of exposure of image for recording (CAP image) is greater than or equal to specified time, and display control is executed depending on determination result
5. Sequence of processing executed by imaging apparatus
6. Other embodiments
7. Summary of configuration of present disclosure

1. Overview of Capturing and Display Processing of Image in Imaging Apparatus First, with reference to FIGS. 1A and 1B and subsequent drawings, an overview will be described of capturing and display processing of an image in an imaging apparatus (camera).

FIGS. 1A and 1B illustrate the following processing examples in the imaging apparatus.

FIG. 1A Data processing example at time of non-execution of image-capturing processing (at time of execution of live view image (LV) display processing)

FIG. 1B Data processing example at time of execution of image-capturing processing (at time of execution of capture image (CAP) recording processing)

Note that, the live view image (LV) is an image displayed on a display unit of the imaging apparatus, for example, an LCD, an EVF, or the like, which can be confirmed by a user (image-capturing person). It is also called a through image, and is an image continuously displayed on the display unit regardless of execution or non-execution of image-capturing processing.

On the other hand, the capture image (CAP) is an image captured by the user (image-capturing person) operating the release button (shutter button) of the imaging apparatus. The captured image (CAP) is recorded in a recording unit (medium) of the imaging measure.

Note that, generally, the capture image (CAP) is acquired and recorded as a high resolution image having a high number of pixels reflecting the number of pixels of the imaging element, but the live view image (LV) is acquired and displayed as an image having a low number of pixels according to the number of pixels that can be displayed on the display unit.

In other words, the live view image (LV) is an image having a lower number of pixels than those of the capture image (CAP).

Description will be made for the FIG. 1A data processing example at time of non-execution of image-capturing processing (at time of execution of live view image (LV) display processing) illustrated in FIGS. 1A and 1B.

Light incident through an optical lens 11 is incident on an imaging unit, for example, an imaging element 12 including a CMOS image sensor or the like, and image data obtained by photoelectric conversion is output. Note that, an output image in this case is an image for displaying (LV image) to be displayed on a display unit 21.

Hereinafter, an image to be displayed on the display unit is referred to as an image for displaying or an LV image, while an image for image-capturing recording is referred to as an image for recording, a capture image, or a CAP image.

When outputting the image for displaying (LV image) to be displayed on the display unit, the imaging element 12 outputs an image having a low number of pixels partially thinned out without outputting all pixel data of the imaging element.

In a case where the image-capturing processing is executed, it is necessary to generate an image for recording having a high number of pixels, so that almost all pixel data of the imaging element is output.

At time of FIG. 1A non-execution of image-capturing processing (at time of execution of live view image (LV) display processing) illustrated in FIGS. 1A and 1B, the imaging element 12 inputs an output image (LV image) having a low number of pixels to an AD conversion unit 13.

The AD conversion unit 13 executes A/D conversion of an input signal, in other words, processing of converting an analog signal into a digital signal, and stores a digital value after conversion in a frame memory 14.

In the example illustrated in the figure, the frame memory 14 has a configuration enabled to store two image frames. Captured images of the imaging element 12 are alternately stored in a first frame memory (FM1) and a second frame memory (FM2).

In other words, the frame memory 14 stores two consecutively captured image frames simultaneously.

The images stored in the frame memory 14 are sequentially output to a signal processing unit (signal processing LSI) 15 from a preceding storage frame.

In other words, the images are sequentially output to the signal processing unit (signal processing LSI) 15 in accordance with the image-capturing order alternately from the first frame memory (FM1) and the second frame memory (FM2).

The signal processing unit 15 executes signal processing in a general camera, for example, white balance (WB) adjustment, gamma correction, and the like, to generate an output image, in other words, an image (LV image) to be displayed on the display unit 21, and stores the image in a memory 16.

The display unit 21 displays the LV image stored in the memory 16.

The display unit 21 includes, for example, an LCD, an EVF, or the like, and can be confirmed by the image-capturing person.

Next, description will be made for the FIG. 1B data processing example at time of execution of image-capturing processing (at time of execution of capture image (CAP) recording processing) illustrated in FIGS. 1A and 1B.

When the image-capturing person operates (presses) the release button (shutter button), the processing of (2) is performed.

When the image-capturing person operates (presses) the release button (shutter button), light incident through the optical lens 11 is incident on an imaging unit, for example, the imaging element 12 including a CMOS image sensor or the like, and exposure processing is started.

However, there is a certain time interval, in other words, a release lag (release time lag), after the release button (shutter button) is pressed until the exposure processing in the imaging element 12 is started.

Although there is a slight difference depending on the camera, the release lag is about 15 msec to 30 msec in many cameras.

When the exposure processing in the imaging element 12 ends, the imaging element 12 outputs the image data obtained by photoelectric conversion to the AD conversion unit 13. Note that, the output image in this case is an image for recording (CAP image) to be recorded and saved in a recording unit 22.

The image for recording (CAP image) is an image having a high number of pixels reflecting the number of pixels of the imaging element 12. The CAP image is an image of a high number of pixels having a larger number of pixels than those of the image for displaying (LV image) described with reference to (1).

In FIGS. 1A and 1B, arrows of the LV image illustrated in FIG. 1A are indicated thin, arrows of the CAP image illustrated in FIG. 11B are indicated thick, and the high/low of the number of pixels is indicated by the thickness of the arrow.

The AD conversion unit 13 executes A/D conversion of an input signal, in other words, processing of converting an analog signal into a digital signal, and stores a digital value after conversion in the frame memory 14.

Captured images of the imaging element 12 are alternately stored in the first frame memory (FM1) and the second frame memory (FM2).

The images stored in the frame memory 14 are sequentially output to the signal processing unit (signal processing LSI) 15 from a preceding storage frame.

In other words, the images are sequentially output to the signal processing unit (signal processing LSI) 15 in accordance with the image-capturing order alternately from the first frame memory (FM1) and the second frame memory (FM2).

The signal processing unit 15 executes signal processing in a general camera, for example, white balance (WB) adjustment, gamma correction, and the like, to generate an output image.

In this case, the signal processing unit 15 generates an image for recording (CAP image) having a high number of pixels to be stored in the recording unit 22, and moreover, also generates an image for displaying (LV image) to be displayed on the display unit 21 and stores the LV image in the memory 16. The image for displaying (LV image) is, for example, an image of a low number of pixels generated by thinning processing of the image for recording (CAP image) that is an image of a high number of pixels.

The recording unit 22 stores the image for recording (CAP image) having a high number of pixels stored in the memory 16.

On the other hand, the display unit 21 displays the image for displaying (LV image) having a low number of pixels stored in the memory 16.

The above is the overview of the processing at the time of execution and non-execution of image capturing in the imaging apparatus.

Next, a temporal flow of these pieces of processing will be described with reference to timing charts illustrated in FIGS. 2A, 2B, 2C, 2D, 2E, 2F, 2G, and 2H and subsequent drawings.

FIGS. 2A, 2B, 2C, 2D, 2E, 2F, 2G, and 2H are timing charts illustrating processing in a period in which image-capturing processing by the user (image-capturing person), in other words, pressing processing of the release button (shutter button) is not performed, in other words, a processing sequence in a case where the image for displaying (LV image) is displayed on the display unit of the imaging apparatus.

Time passes from left to right.

FIGS. 2A, 2B, 2C, 2D, 2E, 2F, 2G, and 2H individually illustrate processing timings of the following.

FIG. 2A Imaging element input synchronization signal
FIG. 2B Exposure processing of imaging element and output to frame memory
FIG. 2C Stored image of first frame memory (FM1)
FIG. 2D Stored image of second frame memory (FM2)
FIG. 2E Image-capturing operation (release (shutter) operation)
FIG. 2F Processing of control unit
FIG. 2G Display unit input synchronization signal
FIG. 2H Display unit display image The FIG. 2A imaging element input synchronization signal is a synchronization signal input to the imaging element 12 by control of a control unit of the imaging apparatus. In this example, the synchronization signal for each 16.7 msec is set to be input to the imaging element 12.

The imaging element 12 updates processing to be executed, such as the start of various types of processing and processing switching, in response to input of the synchronization signal.

The FIG. 2B exposure processing of imaging element and output to frame memory illustrates the exposure processing in the imaging element 12 and storage processing of the image after AD conversion for the exposure result in the frame memory 14.

LV1, LV2, LV3 . . . illustrated in the figure each indicate the exposure processing of the image for displaying (LV image) to be displayed on the display unit 21. The exposure processing of each of these images is executed for each synchronization signal for each 16.7 msec.

FIG. 2C Stored image of first frame memory (FM1)
FIG. 2D Stored image of second frame memory (FM2)

These illustrate sequences of stored images of the first frame memory (FM1) and the second frame memory (FM2) that are two memory units of the frame memory 14.

As described above, captured images of the imaging element 12 are alternately stored in the first frame memory (FM1) and the second frame memory (FM2).

In the example illustrated in the figure, first, the first image for displaying (LV1) is stored in the first frame memory (FM1), and the next image for displaying (LV2) is stored in the second frame memory (FM2).

Thereafter, the images for displaying (LV3, LV4, LV5 . . . ) are alternately stored in the first frame memory (FM1) and the second frame memory (FM2).

The FIG. 2E image-capturing operation (release (shutter) operation) illustrates image-capturing operation by the user (image-capturing person), in other words, pressing processing of the release button (shutter button).

FIGS. 2A, 2B, 2C, 2D, 2E, 2F, 2G, and 2H are processing sequence in a case where the image-capturing operation by the user (image-capturing person) is not performed, so that image-capturing operation timing is not illustrated.

Note that, processing in a case where the image-capturing processing is executed will be described later with reference to FIGS. 3A, 3B, 3C, 3D, 3E, 3F, 3G, and 3H.

The FIG. 2F processing of control unit illustrates a sequence of control processing executed in the control unit of the imaging apparatus. Note that, although the control unit is not illustrated in FIGS. 1A and 1B described above, the imaging apparatus includes the control unit that performs control of processing executed by the imaging apparatus in accordance with a program stored in, for example, a storage unit. The control unit performs control of processing executed by each component illustrated in FIGS. 1A and 1B.

The FIG. 2F processing of control unit of FIGS. 2A, 2B, 2C, 2D, 2E, 2F, 2G, and 2H illustrates part of various types of processing executed by the control unit. FIGS. 2A, 2B, 2C, 2D, 2E, 2F, 2G, and 2H mainly illustrate a sequence of processing relating to control of an image to be displayed on the display unit.

The figure illustrates rectangular boxes of FM1, FM2, FM1, FM2 . . . as the sequence of the FIG. 2F processing of control unit.

FM1 represents control of display reservation processing of the latest image stored in the first frame memory (FM1) and display processing of displaying the latest image stored in the first frame memory (FM1) on the display unit 21.

FM2 represents control of display reservation processing of the latest image stored in the second frame memory (FM2) and display processing of displaying the latest image stored in the second frame memory (FM2) on the display unit 21.

The control unit alternately executes pieces of processing respectively corresponding to the frame memories, to FM1, FM2, FM1, FM2 . . . as illustrated in the sequence of the FIG. 2F processing of control unit. In other words, pieces of processing are alternately executed of
(1) display reservation for the first frame memory (FM1) and display processing of the stored image of the first frame memory (FM1), and
(2) display reservation for the second frame memory (FM2) and display processing of the stored image of the second frame memory (FM2).

With this control processing, the stored images of the first frame memory (FM1) and the second frame memory (FM2) of the frame memory 14 are alternately displayed on the display unit 21.

The FIG. 2G display unit input synchronization signal is a synchronization signal input to the display unit 21 by control of the control unit of the imaging apparatus. The display unit 21 performs processing such as switching of display images in response to input of the synchronization signal.

The FIG. 2H display unit display image illustrates images displayed on the display unit 21.

LV1, LV2 . . . correspond to image frames 1 and 2 of the display image, and mean that display frames are switched at a signal interval of the display unit input synchronization signal. In other words, the display unit 21 displays a moving image by a live view image (through image).

Next, with reference to FIGS. 3A, 3B, 3C, 3D, 3E, 3F, 3G, and 3H, description will be made for processing in a case where image-capturing processing by the user (image-capturing person) is performed, in other words, pressing processing of the release button (shutter button) is performed, in other words, a processing sequence in a case where the image-capturing processing by the user (image-capturing person) is executed during a period in which the image for displaying (LV image) is displayed on the display unit of the imaging apparatus, and the image for recording (CAP image) captured is displayed on the display unit.

Time passes from left to right.

Similarly to FIGS. 2A, 2B, 2C, 2D, 2E, 2F, 2G, and 2H, FIGS. 3A, 3B, 3C, 3D, 3E, 3F, 3G, and 3H individually illustrate the processing timings of the following.

FIG. 3A Imaging element input synchronization signal
FIG. 3B Exposure processing of imaging element and output to frame memory
FIG. 3C Stored image of first frame memory (FM1)
FIG. 3D Stored image of second frame memory (FM2)
FIG. 3E Image-capturing operation (release (shutter) operation)
FIG. 3F Processing of control unit
FIG. 3G Display unit input synchronization signal
FIG. 3H Display unit display image As illustrated in the vicinity of the center on the line of the FIG. 3E image-capturing operation (release (shutter) operation) of FIGS. 3A, 3B, 3C, 3D, 3E, 3F, 3G, and 3H, it is assumed that the image-capturing operation by the user, in other words, the pressing processing of the release button (shutter button) is performed in step S01.

When the image-capturing operation by the user, in other words, the pressing processing of the release button (shutter button) is performed, the control unit starts exposure preparation processing.

The exposure preparation processing is processing, for example, output processing of control signals to the imaging element and the signal processing unit from the control unit, setting processing based on the control signals in the imaging element and the signal processing unit, and the like.

The exposure preparation processing includes, for example, mode switching processing of the imaging element (image sensor) 12.

When outputting the image for displaying (LV image) to be displayed on the display unit 21, the imaging element 12 outputs an image having a low number of pixels partially thinned out without outputting all pixel data of the imaging element.

However, in a case where the image-capturing processing is executed, it is necessary to generate an image for recording having a high number of pixels, so that almost all pixel data of the imaging element is output.

The exposure preparation processing includes mode switching processing for changing output data of the imaging element 12, and the like.

When the mode switching processing for changing output data is started, the imaging element 12 has to stop the exposure processing of the image for displaying (LV image) and memory output processing.

Note that, although there is a slight difference depending on the camera, the exposure preparation processing takes a time of about 15 msec to 30 msec in many cameras.

As illustrated in the vicinity of the center of the line of the FIG. 3E image-capturing operation (release (shutter) operation) of FIGS. 3A, 3B, 3C, 3D, 3E, 3F, 3G, and 3H, when the image-capturing operation by the user, in other words, the pressing processing of the release button (shutter button) is performed in step S01, the control unit starts exposure preparation processing in step S02.

Moreover, with the start of the exposure preparation processing in step S02, the control unit requests the imaging element 12 to stop the exposure processing of the image for displaying (LV image) and start the mode switching in step S03.

In the example illustrated in the figure, the exposure processing is stopped in the middle of the exposure of the image for displaying (LV5).

Moreover, with the start of the exposure preparation processing in step S02, the control unit requests the display unit 21 to stop the display image, in other words, to perform blackout processing, in step S04.

This is because the image for displaying (LV image) to be displayed next cannot be acquired from the frame memory 14 due to stop of the exposure processing of the image for displaying (LV image) by the imaging element 12.

In the example illustrated in the figure, the request for stop of the display image, in other words, for the blackout processing is output to the display unit during display of the image for displaying (LV4), and the screen of the display unit 21 is switched to the blackout (black image output).

Thereafter, when the exposure preparation processing is completed, the control unit notifies the imaging element 12 that the exposure preparation processing is completed in step S05, and causes the imaging element 12 to start exposure processing of the image for recording (CAP image).

In step S06, the imaging element 12 starts the exposure processing of the image for recording (CAP image).

The period of exposure is set corresponding to, for example, a period set by the user, in other words, the shutter speed.

The control unit further executes display reservation of the image for recording (CAP image) in step S07, and executes display processing of the image for recording (CAP image) in step S08.

In other words, the image for recording (CAP image) obtained by the exposure processing of the image for recording (CAP image) by the imaging element 12 in step S06 is stored in the second frame memory (FM2).

This corresponds to that a display reservation sequence executed by the control unit is alternately executed to FM1, FM2, FM1, FM2 . . . , and the latest display reservation before the start of image capturing of the image for recording (CAP image) is issued to the first frame memory (FM1), and the next display reservation is issued to the second frame memory (FM2).

The control unit executes display reservation of the image for recording (CAP image) to the second frame memory (FM2) in step S07, and executes processing of reading the image for recording (CAP image) from the second frame memory (FM2) and displaying the image for recording (CAP image) on the display unit 21 in step S08.

Note that, in the display processing, processing is performed in which thinning processing depending on the number of display pixels of the display unit 21 is performed on the image for recording (CAP image) stored in the second frame memory (FM2) and the thinned image is displayed.

As understood from the sequence diagram illustrated in FIGS. 3A, 3B, 3C, 3D, 3E, 3F, 3G, and 3H, when the image-capturing processing by the user (image-capturing person), in other words, pressing of the release button (shutter button) is performed, the control unit requests the display unit 21 to stop the display image, in other words, to perform the blackout processing, and the display unit 21 causes the screen to be in the blackout (black image output).

Thereafter, the blackout (black image output) state is continued in the display unit 21 until the exposure processing of the image for recording (CAP image) and the storage processing in the frame memory 14 are ended and the image for recording (CAP image) can be displayed.

Note that, in the configuration described with reference to FIGS. 1A, 1B, 2A, 2B, 2C, 2D, 2E, 2F, 2G, 2H, 3A, 3B, 3C, 3D, 3E, 3F, 3G, and 3H, a usage example has been described of the imaging apparatus including two frame memories; however, a similar blackout occurs even in a configuration in which captured images are sequentially stored in one frame memory.

Hereinafter, embodiments will be described of the present disclosure having a configuration in which occurrence of such a blackout of the display unit is prevented.

2. Configuration Example of Imaging Apparatus of Present Disclosure

First, with reference to FIG. 4, a configuration example will be described of an imaging apparatus 100 of the present disclosure.

The imaging apparatus 100 illustrated in FIG. 4 includes an optical lens 101, an imaging element 102, an AD conversion unit 103, a frame memory 104, a signal processing unit (signal processing LSI) 105, a memory 106, a display unit (LCD/EVF) 107, a recording unit 108, an operation unit 109, and a control unit 110.

The frame memory 104 includes a first frame memory (FM1) 121 and a second frame memory (FM2) 122, and is enabled to store two image frames.

The operation unit 109 is an operation unit for performing user input, for example, a release button (shutter button), setting of an image-capturing aspect and an image-capturing mode, setting of a display image of the display unit 107, or the like.

Note that, the display unit 107 can also be made as a touch panel type and used as a user operation unit.

The control unit 110 inputs control signals and synchronization signals to components (the imaging element 102, . . . , the recording unit 108), and executes various types of processing control such as control of execution timing of processing of each component.

For example, the control unit 110 executes output control of a synchronization signal that defines a processing timing of the imaging element 102, output control of a synchronization signal that defines switching timing of the display image of the display unit 107, and the like.

Specifically, the control unit 110 includes a CPU or the like that executes processing according to a program stored in a storage unit (not illustrated).

The program includes, for example, a control program for image capturing, image recording, and image display processing, a synchronization signal output control program, and the like.

Light incident through the optical lens 101 is incident on an imaging unit, for example, an imaging element 102 including a CMOS image sensor or the like, and image data obtained by photoelectric conversion is output. Note that, the output image of the imaging element 102 is the image for displaying (LV image) having a low number of pixels to be displayed on the display unit 107 in a case where image-capturing processing is not executed, and is the image for recording (CAP image) having a high number of pixels to be stored in the recording unit 108 in a case where the image-capturing processing is executed.

The output image from the imaging element 102 is input to the AD conversion unit 103.

The AD conversion unit 103 executes A/D conversion of an input signal, in other words, processing of converting an analog signal into a digital signal, and stores a digital value after conversion in the frame memory 104.

In the example illustrated in the figure, the frame memory 104 has a configuration enabled to store two image frames. Captured images of the imaging element 102 are alternately stored in the first frame memory (FM1) and the second frame memory (FM2).

In other words, the frame memory 14 stores two consecutively captured image frames simultaneously.

The images stored in the frame memory 104 are sequentially output to the signal processing unit (signal processing LSI) 105 from a preceding storage frame.

In other words, the images are sequentially output to the signal processing unit (signal processing LSI) 105 in accordance with the image-capturing order alternately from the first frame memory (FM1) and the second frame memory (FM2).

Note that, although the example illustrated in FIG. 4 includes two frame memories, the captured images may be stored sequentially in one frame memory.

The signal processing unit 105 executes signal processing in a general camera, for example, white balance (WB) adjustment, gamma correction, and the like, to generate the output image, in other words, at least one of the image for displaying (LV image) to be displayed on the display unit 107 or the image for recording (CAP image) to be stored in the recording unit 108, and stores the image in the memory 106.

The display unit 107 displays the image for displaying (LV image) stored in the memory 106.

The display unit 107 includes, for example, an LCD, an EVF, or the like, and can be confirmed by the image-capturing person.

Furthermore, the recording unit 108 stores the image for recording (CAP image) stored in the memory 106.

3. Embodiments of Imaging Apparatus in which Blackout of Display Unit is Prevented Next, embodiments will be described of an imaging apparatus in which the blackout of the display unit is prevented.

The following embodiments will be sequentially described.

(First embodiment) Embodiment in which blackout of display unit is prevented by starting exposure preparation processing after completion of exposure of image for displaying (Second embodiment) Embodiment in which blackout of display unit is prevented by starting exposure preparation processing after lapse of waiting time for making release time lag constant after completion of exposure of image for displaying (Third embodiment) Embodiment in which blackout of display unit is prevented by canceling display reservation of unexposed image and performing continuous display of display image of display unit (Fourth embodiment) Embodiment in which blackout of display unit is prevented by continuously displaying the same image on display unit even after memory switching, by performing inter frame memory copy of latest image having been stored in frame memory

3-1. (First Embodiment) Embodiment in which Blackout of Display Unit is Prevented by Starting Exposure Preparation Processing after Completion of Exposure of Image for Displaying First, as a first embodiment, an embodiment will be described in which the blackout of the display unit is prevented by starting exposure preparation processing after completion of exposure of an image for displaying.

FIGS. 5A, 5B, 5C, 5D, 5E, 5F, 5G, and 5H are timing charts illustrating a processing sequence of the first embodiment.

Similarly to FIGS. 3A, 3B, 3C, 3D, 3E, 3F, 3G, and 3H described above, FIGS. 5A, 5B, 5C, 5D, 5E, 5F, 5G, and 5H illustrate a processing sequence in a case where the image for displaying (LV image) is displayed on the display unit of the imaging apparatus, and during the display, image-capturing processing by the user (image-capturing person), in other words, pressing processing of the release button (shutter button) is performed.

Specifically, it is the processing sequence in a case where the image-capturing processing by the user (image-capturing person) is executed during the period in which the image for displaying (LV image) is displayed on the display unit of the imaging apparatus, and the image for recording (CAP image) captured is displayed on the display unit.

Time passes from left to right.

Similarly to FIGS. 2A, 2B, 2C, 2D, 2E, 2F, 2G, 2H, 3A, 3B, 3C, 3D, 3E, 3F, 3G, and 3H described above, FIGS. 5A, 5B, 5C, 5D, 5E, 5F, 5G, and 5H individually illustrate the processing timings of the following.

FIG. 5A Imaging element input synchronization signal

FIG. 5B Exposure processing of imaging element and output to frame memory

FIG. 5C Stored image of first frame memory (FM1)

FIG. 5D Stored image of second frame memory (FM2)

FIG. 5E Image-capturing operation (release (shutter) operation)

FIG. 5F Processing of control unit

FIG. 5G Display unit input synchronization signal

FIG. 5H Display unit display image

Hereinafter, pieces of processing will be sequentially described of processing steps S11 to S18 illustrated in FIGS. 5A, 5B, 5C, 5D, 5E, 5F, 5G, and 5H.

(Step S11)

First, in step S11, as illustrated in the vicinity of the center of the line of the FIG. 5E image-capturing operation (release (shutter) operation) of FIGS. 5A, 5B, 5C, 5D, 5E, 5F, 5G, and 5H, the image-capturing operation by the user, in other words, the pressing processing of the release button (shutter button) is performed.

(Step S12)

When the image-capturing operation by the user, in other words, the pressing processing of the release button (shutter button) is performed in step S11, the control unit 110 waits until completion of the exposure processing of the image for displaying (LV image) during execution by the imaging element 102 and output processing of exposure data to the frame memory 104 in step S12.

In the example illustrated in FIGS. 5A, 5B, 5C, 5D, 5E, 5F, 5G, and 5H, the image for displaying being in execution of exposure in the imaging element 102 at the time of execution of the image-capturing operation in S11 is the LV5 image. In step S12, waiting is performed until completion of the exposure processing of the LV5 image and the output processing of the exposure data to the frame memory 104.

Note that, the waiting time also includes storage time of the exposure data to the frame memory 104, in other words, exposure data reading time from the imaging element 102.

(Step S13)

After completion of waiting processing in step S12, the control unit 110 starts exposure preparation processing in step S13.

The exposure preparation processing is time required for, for example, output processing of control signals to the imaging element 102 and the signal processing unit 105 from the control unit 110, setting processing based on the control signals in the imaging element and the signal processing unit, and the like.

The exposure preparation processing includes, for example, mode switching processing of the imaging element 102.

As described above, when outputting the image for displaying (LV image) to be displayed on the display unit 107, the imaging element 102 outputs an image having a low number of pixels partially thinned out without outputting all pixel data of the imaging element 102.

However, in a case where the image-capturing processing is executed, it is necessary to generate an image for recording having a high number of pixels, so that almost all pixel data of the imaging element 102 is output.

The exposure preparation processing includes mode switching processing for changing output data of the imaging element 102, and the like.

(Step S14)

When the exposure preparation processing is started in step S13, the control unit 110 further makes preparation request for exposure stop processing and image for recording (CAP image) exposure processing to the imaging element 102 in step S14.

The imaging element 102 starts preparation for the image for recording (CAP image) exposure processing, for example, mode switching processing for changing to output data having a high number of pixels. When this processing is started, the imaging element 102 stops the exposure processing of the image for displaying (LV image) and memory output processing.

However, in the present embodiment, the image for displaying (LV5 image) being in execution of exposure by the imaging element 102 at the time of image-capturing operation execution has been stored in the first frame memory (FM1) by the waiting processing in step S12.

(Step S15)

In step S15, the control unit 110 reads the latest image stored in the first frame memory (FM1), in other word, the image for displaying (LV5) in accordance with the display reservation for the first frame memory (FM1) having been executed before the start of the exposure preparation processing in step S14, and displays the image on the display unit 107.

The display image is the image for displaying (LV5) stored in the first frame memory (FM1) during the waiting processing in step S12 described above.

(Step S16)

Thereafter, when the exposure preparation processing is completed, the control unit 110 notifies the imaging element 102 that the exposure preparation processing is completed in step S16, and causes the imaging element 102 to start exposure processing of the image for recording (CAP image).

(Step S17)

In step S17, the imaging element 102 starts the exposure processing of the image for recording (CAP image).

The period of exposure is set corresponding to, for example, a period set by the user, in other words, the shutter speed.

(Steps S18 to S19)

The control unit 110 further executes display reservation of the image for recording (CAP image) in step S18, and executes display processing of the image for recording (CAP image) in step S19.

Note that, the image for recording (CAP image) obtained by the exposure processing of the image for recording (CAP image) by the imaging element 102 in step S17 is stored in the second frame memory (FM2).

This corresponds to that the display reservation sequence executed by the control unit is alternately executed to FM1, FM2, FM1, FM2 . . . , and the latest display reservation before the start of capturing of the image for recording (CAP image) is issued to the first frame memory (FM1), and the next display reservation is issued to the second frame memory (FM2).

The control unit executes display reservation of the image for recording (CAP image) to the second frame memory (FM2) in step S18, and executes processing of reading the image for recording (CAP image) from the second frame memory (FM2) and displaying the image for recording (CAP image) on the display unit 107 in step S19.

Note that, in the display processing, processing is performed in which thinning processing depending on the number of display pixels of the display unit 107 is performed on the image for recording (CAP image) stored in the second frame memory (FM2) and the thinned image is displayed.

As understood from the sequence diagram illustrated in FIGS. 5A, 5B, 5C, 5D, 5E, 5F, 5G, and 5H, when the image-capturing processing by the user (image-capturing person), in other words, pressing of the release button (shutter button) is performed, the control unit 110 waits until completion of the exposure processing of the image for displaying (LV image) during execution by the imaging element 102 and output processing of exposure data to the frame memory 104 in step S12.

In the example illustrated in FIGS. 5A, 5B, 5C, 5D, 5E, 5F, 5G, and 5H, the image for displaying being in execution of exposure in the imaging element 102 at the time of execution of the image-capturing operation in S11 is the LV5 image. In step S12, waiting is performed until completion of the exposure processing of the LV5 image and the output processing of the exposure data to the frame memory 104.

By this waiting processing, the image for displaying (LV5) being exposed can be stored in the frame memory at pressing timing of the release button (shutter button), and the image for displaying (LV5) can be displayed on the display unit 107.

The display processing of the image for displaying (LV5) on the display unit 107 is continued until the image for recording (CAP image) is stored in the frame memory 104 and can be displayed.

When the image for recording (CAP image) is stored in the frame memory 104 and can be displayed, the image for recording (CAP image) is read from the frame memory 104 and displayed on the display unit 107 in steps S18 to S19.

As a result of these pieces of processing, the image for displaying (LV5) being exposed at the time of the image-capturing operation execution is displayed on the display unit 107 continuously to the display processing of the image for displaying (LV4) before the time of the image-capturing operation execution, and moreover, the image for recording (CAP image) is displayed continuously to the display processing of the image for displaying (LV5).

In other words, the image display on the display unit 107 is continuously executed without causing the blackout.

Note that, regarding the present embodiment, a processing example has been described in which two frame memories are included; however, in the present embodiment, a similar effect can be obtained in a configuration in which captured images are sequentially stored in one frame memory.

3-2. (Second Embodiment) Embodiment in which Blackout of Display Unit is Prevented by Starting Exposure Preparation Processing after Lapse of Waiting Time for Making Release Time Lag Constant after Completion of Exposure of Image for Displaying Next, as a second embodiment, an embodiment will be described in which blackout of the display unit is prevented by starting exposure preparation processing after the lapse of the waiting time for making the release time lag constant after completion of exposure of an image for displaying.

The second embodiment is an improved version of the first embodiment described above.

As described above with reference to FIGS. 5A, 5B, 5C, 5D, 5E, 5F, 5G, and 5H, in the first embodiment, waiting is performed until completion of the exposure of the image for displaying (LV image) during execution at the time of the image-capturing operation execution, and after the lapse of the waiting time, the exposure preparation processing of the image for recording (CAP image) is started, whereby the blackout of the display unit is prevented.

However, if this configuration is adopted, there is a problem that a release time lag changes to various times, the release time lag being a time from image-capturing operation executed by the user (image-capturing person), in other words, pressing operation of the release button to the exposure start of the image for recording (CAP image) that is a captured image corresponding to the image-capturing operation.

The release time lag will be briefly described.

There is a certain time lag (time delay) until the release button (shutter button) is pressed and the exposure processing of the imaging element of the camera is actually started.

This time lag is called a release time lag or a release lag.

Although there is a slight difference in the release time lag depending on the camera, the release lag is within a time range of about 15 msec to 30 msec in many cameras.

In one camera, the release time lag is a constant time, for example, 20 msec.

In a case where a stationary subject not moving is image-captured, no significant change occurs between the subject at the timing when the release button (shutter button) is pressed and the subject after the lapse of the release time lag, so that a subject image intended by the image-capturing person can be recorded as a recorded image in the memory of the camera.

However, for example, in a case where a subject moving at high speed is captured, the subject at the timing when the release button (shutter button) is pressed may be largely different from the subject after the lapse of the release time lag. In such a case, an image different from the subject image intended by the image-capturing person is recorded in the memory of the camera.

A general user performs image capturing without paying attention to the release time lag, but for example, a professional image-capturing person or the like often performs image-capturing processing in consideration of the release time lag of the camera used. In other words, the display image of the display unit such as the LCD display unit or the electric view finder (EVF) of the camera is confirmed, and moreover, the release lag is considered, and then the release button (shutter button) is pressed at a pressing timing.

Specifically, image-capturing processing is performed in which the display image of the display unit of the camera is confirmed, and moreover, an image after the lapse of the release time lag is estimated, and then the release button (shutter button) is pressed at a timing immediately before the image estimated so that the image estimated can be captured.

However, to capture an image assumed by the image-capturing person by controlling the pressing timing of the release button (shutter button) in this way is under the condition that the time of the release time lag is always constant.

If the time of the release time lag differs depending on the release button pressing timing, advanced image capturing in consideration of the release time lag cannot be performed, and image capturing of an image intended by the image-capturing person becomes difficult.

As described above, to capture the image intended by the image-capturing person, it is required to make the release time lag constant.

As described above, in the first embodiment described above with reference to FIGS. 5A, 5B, 5C, 5D, 5E, 5F, 5G, and 5H, waiting is performed until completion of the exposure of the image for displaying (LV image) during execution at the time of the image-capturing operation execution, and after the lapse of the waiting time, the exposure preparation processing of the image for recording (CAP image) is started, whereby the blackout of the display unit is prevented. However, in this configuration, the release time lag changes, which is the time from the pressing operation of the release button by the user (image-capturing person) to the exposure start of the image for recording (CAP image) corresponding to the image-capturing operation.

This problem will be described with reference to FIGS. 6A and 6B.

FIGS. 6A and 6B illustrate the following two processing examples to which the first embodiment described above with reference to FIGS. 5A, 5B, 5C, 5D, 5E, 5F, 5G, and 5H are applied.

(1) Case where image-capturing operation is executed immediately before exposure end of image for displaying (LV5)

(2) Case where image-capturing operation is executed at time of exposure start of image for displaying (LV5)

In a case where the first embodiment described above with reference to FIGS. 5A, 5B, 5C, 5D, 5E, 5F, 5G, and 5H are applied to the case of FIG. 6A, the waiting time is a time from the time of image-capturing operation to the exposure end of the image for displaying (LV5), and is a time from t11 to t12 illustrated in the figure.

The release time lag in this case is a time (t11 to t13) obtained by adding an exposure preparation processing period (t12 to t13) to the waiting time (t11 to t12). Note that, as described above, although the exposure preparation processing period varies depending on the imaging apparatus, the period is a constant time, for example, 20 msec, in one camera.

In the case of FIG. 6A, the exposure preparation processing period (t12 to t13) is this 20 msec, and the release time lag (t11 to ta3) is a time obtained by adding the waiting time (t11 to t12) to this 20 msec.

On the other hand, in a case where the first embodiment described above with reference to FIGS. 5A, 5B, 5C, 5D, 5E, 5F, 5G, and 5H are applied to the case of FIG. 6B, the waiting time is a time from the time of image-capturing operation to the exposure end of the image for displaying (LV5), and is a time from t21 to t22 illustrated in the figure.

The release time lag in this case is a time (t21 to t23) obtained by adding an exposure preparation processing period (t22 to t23) to the waiting time (t21 to t22).

In the cases of FIGS. 6A and 6B, both the exposure preparation processing period (t12 to t13) of the case FIG. 5A and the exposure preparation processing period (t22 to t23) of the case FIG. 5B are the same with each other, and, for example, 20 msec.

However, the waiting time (t11 to t12) of the case FIG. 5A is a time from the time (t11) of the start of the image-capturing operation immediately before the exposure end of the image for displaying (LV5) to the time (t12) at which the exposure of the image for displaying (LV5) ends and the image is stored in the memory, and is set shorter than that of the case of FIG. 6B as understood from the figure.

The waiting time (t21 to t22) of the case of FIG. 6B is a time from the time (t21) of the start of the image-capturing operation at the time of the exposure start of the image for displaying (LV5) to the time (t22) at which the exposure of the image for displaying (LV5) ends and the image is stored in the memory, and is set longer than that of the case of FIG. 6B as understood from the figure.

As a result, when both of FIGS. 6A and 6B are compared with each other, the release time lag (t21 to t23) of the case of FIG. 6B is longer than the release time lag (t11 to t13) of the case of FIG. 6B.

As described above, in a case where the first embodiment described with reference to FIGS. 5A, 5B, 5C, 5D, 5E, 5F, 5G, and 5H are applied, a problem occurs that the release time lag differs depending on the timing of the image-capturing operation of the user (image-capturing person).

The second embodiment described below is an embodiment in which this point is improved and the release time lag is made constant regardless of the timing of the image-capturing operation of the user (image-capturing person).

Specifically, the waiting time is set assuming that it is the assumed longest time, in other words, similarly to the case illustrated in FIG. 6B the image-capturing operation is executed at the time of the exposure start of the image for displaying (LV image). By performing such setting of the waiting time, the release time lag can be made constant.

With reference to FIGS. 7A, 7B, 7C, 7D, 7E, 7F, 7G, and 7H, description will be made for the second embodiment, in other words, the embodiment in which the blackout of the display unit is prevented by starting exposure preparation processing after the lapse of the waiting time for making the release time lag constant after completion of exposure of an image for displaying.

FIGS. 7A, 7B, 7C, 7D, 7E, 7F, 7G, and 7H are timing charts illustrating a processing sequence of the second embodiment.

Similarly to FIGS. 5A, 5B, 5C, 5D, 5E, 5F, 5G, and 5H described above, FIGS. 7A, 7B, 7C, 7D, 7E, 7F, 7G, and 7H illustrate the processing sequence in a case where the image for displaying (LV image) is displayed on the display unit of the imaging apparatus, and during the display, image-capturing processing by the user (image-capturing person), in other words, pressing processing of the release button (shutter button) is performed.

Specifically, the figure illustrates the processing sequence in a case where the image-capturing processing by the user (image-capturing person) is executed during the period in which the image for displaying (LV image) is displayed on the display unit of the imaging apparatus, and the image for recording (CAP image) captured is displayed on the display unit.

Time passes from left to right.

Similarly to FIGS. 5A, 5B, 5C, 5D, 5E, 5F, 5G, and 5H described above, FIGS. 7A, 7B, 7C, 7D, 7E, 7F, 7G, and 7H individually illustrate the processing timings of the following.

FIG. 7A Imaging element input synchronization signal
FIG. 7B Exposure processing of imaging element and output to frame memory
FIG. 7C Stored image of first frame memory (FM1)
FIG. 7D Stored image of second frame memory (FM2)
FIG. 7E Image-capturing operation (release (shutter) operation)
FIG. 7F Processing of control unit
FIG. 7G Display unit input synchronization signal
FIG. 7H Display unit display image Hereinafter, pieces of processing will be sequentially described of processing steps S21 to S28 illustrated in FIGS. 7A, 7B, 7C, 7D, 7E, 7F, 7G, and 7H.

(Step S21)

First, in step S21, as illustrated in the vicinity of the center of the line of the FIG. 7E image-capturing operation (release (shutter) operation) of FIGS. 7A, 7B, 7C, 7D, 7E, 7F, 7G, and 7H, the image-capturing operation by the user, in other words, the pressing processing of the release button (shutter button) is performed.

(Step S22)

When the image-capturing operation by the user, in other words, the pressing processing of the release button (shutter button) is performed in step S21, the control unit 110 waits until a predefined waiting time elapses in step S22.

The predefined waiting time is a waiting time according to the case described above with reference to FIG. 6B. In other words, assuming that the image-capturing operation is performed at the time of the exposure processing start of the image for displaying (LV image) in the imaging element 102, a time required for the exposure processing and the output processing to the frame memory 104 of one image for displaying (LV image) is taken as the waiting time.

The waiting time also includes storage time of the exposure data to the frame memory 104, in other words, exposure data reading time from the imaging element 102, and moreover, in the second embodiment, different from the first embodiment described above, it is set such that exposure preparation processing of the image for recording is started after waiting for an exposure time for the exposure of one frame even in a case where the exposure in the middle of exposure is completed.

In other words, the waiting time of the second embodiment is made constant regardless of the timing of the image-capturing operation.

With this processing, the release time lag, in other words, the time from the image-capturing operation to the exposure start of the image for recording (CAP image) corresponding to the image-capturing operation is (constant waiting time)+(constant exposure preparation processing time), and is always constant.

(Step S23)

After completion of the waiting processing in step S22, the control unit 110 starts exposure preparation processing in step S23.

The exposure preparation processing is time required for, for example, output processing of control signals to the imaging element 102 and the signal processing unit 105 from the control unit 110, setting processing based on the control signals in the imaging element and the signal processing unit, and the like.

The exposure preparation processing includes, for example, mode switching processing of the imaging element 102.

As described above, when outputting the image for displaying (LV image) to be displayed on the display unit 107, the imaging element 102 outputs an image having a low number of pixels partially thinned out without outputting all pixel data of the imaging element 102.

However, in a case where the image-capturing processing is executed, it is necessary to generate an image for recording having a high number of pixels, so that almost all pixel data of the imaging element 102 is output.

The exposure preparation processing includes mode switching processing for changing output data of the imaging element 102, and the like.

(Step S24)

When the exposure preparation processing is started in step S23, the control unit 110 further makes preparation request for exposure stop processing and image for recording (CAP image) exposure processing to the imaging element 102 in step S24.

The imaging element 102 starts preparation for the image for recording (CAP image) exposure processing, for example, mode switching processing for changing to output data having a high number of pixels. When this processing is started, the imaging element 102 stops the exposure processing of the image for displaying (LV image) and memory output processing.

However, also in the second embodiment, similarly to the first embodiment described above with reference to FIGS. 5A, 5B, 5C, 5D, 5E, 5F, 5G, and 5H, the image for displaying (LV5 image) being in execution of exposure by the imaging element 102 at the time of the image-capturing operation execution has been stored in the first frame memory (FM1) by the waiting processing in step S22.

(Step S25)

In accordance with a display reservation for the first frame memory (FM1) having been executed before the start of the exposure preparation processing in step S24, the control unit 110 reads the latest image stored in the first frame memory (FM1), in other word, the image for displaying (LV5), and displays the image on the display unit 107 in step S25.

The display image is the image for displaying (LV5) stored in the first frame memory (FM1) during the waiting processing in step S22 described above.

(Step S26)

Thereafter, when the exposure preparation processing is completed, the control unit 110 notifies the imaging element 102 that the exposure preparation processing is completed in step S26, and causes the imaging element 102 to start exposure processing of the image for recording (CAP image).

(Step S27)

In step S27, the imaging element 102 starts the exposure processing of the image for recording (CAP image).

The period of exposure is set corresponding to, for example, a period set by the user, in other words, the shutter speed.

(Steps S28 to S29)

The control unit 110 further executes display reservation of the image for recording (CAP image) in step S28, and executes display processing of the image for recording (CAP image) in step S29.

As understood from the sequence diagram illustrated in FIGS. 7A, 7B, 7C, 7D, 7E, 7F, 7G, and 7H, when the image-capturing processing by the user (image-capturing person), in other words, pressing of the release button (shutter button) is performed, the control unit 110 performs the waiting processing for the predefined waiting time in step S22.

In other words, waiting is performed for a constant waiting time corresponding to the time required for the exposure processing and the output processing (storage processing) to the frame memory 104 of one image for displaying (LV image).

With this processing, the release time lag, in other words, the time from the image-capturing operation to the exposure start of the image for recording (CAP image) corresponding to the image-capturing operation is (constant waiting time)+ (constant exposure preparation processing time), and is always constant.

Furthermore, also in the second embodiment illustrated in FIGS. 7A, 7B, 7C, 7D, 7E, 7F, 7G, and 7H, similarly to the first embodiment described above with reference to FIGS. 5A, 5B, 5C, 5D, 5E, 5F, 5G, and 5H, the image for displaying being in execution of exposure in the imaging element 102 at the time of execution of the image-capturing operation in S21 is the LV5 image, and the image for displaying (LV5) being exposed at the pressing timing of the release button (shutter button) is stored in the frame memory within the waiting time in step S22, and the image for displaying (LV5) can be displayed on the display unit 107.

The display processing of the image for displaying (LV5) on the display unit 107 is continued until the image for recording (CAP image) is stored in the frame memory 104 and can be displayed.

When the image for recording (CAP image) is stored in the frame memory 104 and can be displayed, the image for recording (CAP image) is read from the frame memory 104 and displayed on the display unit 107 in steps S28 to S29.

Note that, in the display processing, processing is performed in which thinning processing depending on the number of display pixels of the display unit 107 is performed on the image for recording (CAP image) stored in the second frame memory (FM2) and the thinned image is displayed.

As a result of these pieces of processing, the image for displaying (LV5) being exposed at the image-capturing operation execution is displayed on the display unit 107 continuously to the display processing of the image for displaying (LV4) before the time of image-capturing operation execution, and moreover, the image for recording (CAP image) is displayed continuously to the display processing of the image for displaying (LV5).

In other words, the image display is continuously executed on the display unit 107 without causing the blackout.

Note that, regarding the present embodiment, a processing example has been described in which two frame memories are included; however, in the present embodiment, a similar effect can be obtained in a configuration in which captured images are sequentially stored in one frame memory.

3-3. (Third Embodiment) Embodiment in which Blackout of Display Unit is Prevented by Canceling Display Reservation of Unexposed Image and Performing Continuous Display of Display Image of Display Unit Next, as a third embodiment, an embodiment will be described in which the blackout of the display unit is prevented by canceling a display reservation of an unexposed image and performing continuous display of a display image of the display unit.

FIGS. 8A, 8B, 8C, 8D, 8E, 8F, 8G, and 8H are timing charts illustrating a processing sequence of the third embodiment.

Similarly to FIGS. 5A, 5B, 5C, 5D, 5E, 5F, 5G, and 5H described above, FIGS. 8A, 8B, 8C, 8D, 8E, 8F, 8G, and 8H illustrate the processing in a case where the image for displaying (LV image) is displayed on the display unit of the imaging apparatus, and during the display, image-capturing processing by the user (image-capturing person), in other words, pressing processing of the release button (shutter button) is performed.

In other words, the figure illustrates the processing sequence in a case where the image-capturing processing by the user (image-capturing person) is executed during the period in which the image for displaying (LV image) is displayed on the display unit of the imaging apparatus, and the image for recording (CAP image) captured is displayed on the display unit.

Time passes from left to right.

Similarly to FIGS. 5A, 5B, 5C, 5D, 5E, 5F, 5G, and 5H described above, FIGS. 8A, 8B, 8C, 8D, 8E, 8F, 8G, and 8H individually illustrate the processing timings of the following.

FIG. 8A Imaging element input synchronization signal

FIG. 8B Exposure processing of imaging element and output to frame memory

FIG. 8C Stored image of first frame memory (FM1)

FIG. 8D Stored image of second frame memory (FM2)

FIG. 8E Image-capturing operation (release (shutter) operation)

FIG. 8F Processing of control unit

FIG. 8G Display unit input synchronization signal

FIG. 8H Display unit display image

Hereinafter, pieces of processing will be sequentially described of processing steps S31 to S38 illustrated in FIGS. 8A, 8B, 8C, 8D, 8E, 8F, 8G, and 8H.

(Step S31)

First, in step S31, as illustrated in the vicinity of the center of the line of the FIG. 8E image-capturing operation (release (shutter) operation) of FIGS. 8A, 8B, 8C, 8D, 8E, 8F, 8G, and 8H, the image-capturing operation by the user, in other words, the pressing processing of the release button (shutter button) is performed.

(Step S32)

When the image-capturing operation by the user, in other words, the pressing processing of the release button (shutter button) is performed in step S31, the control unit 110 starts exposure preparation processing in step S32.

The exposure preparation processing is processing similar to that in the first and second embodiments described above. It is time required for, for example, output processing of control signals to the imaging element 102 and the signal processing unit 105 from the control unit 110, setting processing based on the control signals in the imaging element and the signal processing unit, and the like.

The exposure preparation processing includes, for example, mode switching processing of the imaging element 102.

(Step S33)

When the exposure preparation processing is started in step S32, the control unit 110 further makes preparation request for exposure stop processing and image for recording (CAP image) exposure processing to the imaging element 102 in step S33.

The imaging element 102 starts preparation for the image for recording (CAP image) exposure processing, for example, mode switching processing for changing to output data having a high number of pixels. When this processing is started, the imaging element 102 stops the exposure processing of the image for displaying (LV image) and memory output processing.

In the third embodiment, as illustrated in FIGS. 8A, 8B, 8C, 8D, 8E, 8F, 8G, and 8H, the image being in execution of exposure by the imaging element 102 at the time of image-capturing operation execution is an image for displaying (LV5 image), and in the middle of this period of exposure, the imaging element 102 stops the exposure processing of the image for displaying (LV5) and the memory output processing.

(Step S34)

In the third embodiment, in step S34, the control unit 110 performs processing in which the exposure processing is stopped halfway, and a display reservation is canceled of the image for displaying (LV5) that is not stored in the frame memory.

The display reservation to be canceled is a display reservation executed immediately before the image-capturing operation in step S31. This is a display reservation performed at the time of an imaging element synchronization signal (ta5) illustrated in FIGS. 8A, 8B, 8C, 8D, 8E, 8F, 8G, and 8H.

This display reservation is a display reservation for the image for displaying (LV5) to be stored in the first frame memory.

By the display reservation canceling processing, the display processing to be performed according to the display reservation performed at the time of the imaging element synchronization signal (ta5) illustrated in FIGS. 8A, 8B, 8C, 8D, 8E, 8F, 8G, and 8H, in other words, acquisition of image data from the first frame memory (FM1) of the image for displaying (LV5) to be stored in the first frame memory (FM1) and output processing to the display unit 107 are not performed.

As a result of this processing cancellation, the display unit 107 continues display of the image displayed before the display timing of the image for displaying (LV5), in other words, the image for displaying (LV4) acquired from the second frame memory (FM2).

(Step S35)

Thereafter, when the exposure preparation processing is completed, the control unit 110 notifies the imaging element 102 that the exposure preparation processing is completed in step S35, and causes the imaging element 102 to start exposure processing of the image for recording (CAP image).

(Step S36)

In step S36, the imaging element 102 starts the exposure processing of the image for recording (CAP image).

The period of exposure is set corresponding to, for example, a period set by the user, in other words, the shutter speed.

(Steps S37 to S38)

The control unit 110 further executes display reservation of the image for recording (CAP image) in step S37, and executes display processing of the image for recording (CAP image) in step S38.

As understood from the sequence diagram illustrated in FIGS. 8A, 8B, 8C, 8D, 8E, 8F, 8G, and 8H, in the FIG. 8H display unit display image, the display period of the image for displaying (LV4) acquired from the second frame memory (FM2) is set long, and after the display of this image for displaying (LV4), the image for recording (CAP image) is continuously displayed.

In other words, in the present embodiment, the display processing of the image for displaying (LV4) on the display unit 107 is continued until the image for recording (CAP image) is stored in the frame memory 104 and can be displayed.

When the image for recording (CAP image) is stored in the frame memory 104 and can be displayed, the image for recording (CAP image) is read from the frame memory 104 and displayed on the display unit 107 in steps S37 to S38.

Note that, in the display processing, processing is performed in which thinning processing depending on the number of display pixels of the display unit 107 is performed on the image for recording (CAP image) stored in the second frame memory (FM2) and the thinned image is displayed.

As a result of these pieces of processing, the image for recording (CAP image) is displayed on the display unit 107 continuously to the display processing of the image for displaying (LV4) before the time of image-capturing operation execution.

In other words, the image display is continuously executed on the display unit 107 without causing the blackout.

Note that, regarding the present embodiment, a processing example has been described in which two frame memories are included; however, in the present embodiment, a similar effect can be obtained in a configuration in which captured images are sequentially stored in one frame memory.

3-4. (Fourth Embodiment) Embodiment in which Blackout of Display Unit is Prevented by Continuously Displaying the Same Image on Display Unit Even after Memory Switching, by Performing Inter Frame Memory Copy of Latest Image Having been Stored in Frame Memory Next, as a fourth embodiment, an embodiment will be described in which the blackout of the display unit is prevented by continuously displaying the same image on the display unit even after memory switching, by performing inter frame memory copy of the latest image having been stored in the frame memory.

FIGS. 9A, 9B, 9C, 9D, 9E, 9F, 9G, and 9H are timing charts illustrating a processing sequence of the fourth embodiment.

Similarly to FIGS. 5A, 5B, 5C, 5D, 5E, 5F, 5G, and 5H described above, FIGS. 9A, 9B, 9C, 9D, 9E, 9F, 9G, and 9H are the processing sequence in a case where the image for displaying (LV image) is displayed on the display unit of the imaging apparatus, and during the display, image-capturing processing by the user (image-capturing person), in other words, pressing processing of the release button (shutter button) is performed.

In other words, the figure illustrates the processing sequence in a case where the image-capturing processing by the user (image-capturing person) is executed during the period in which the image for displaying (LV image) is displayed on the display unit of the imaging apparatus, and the image for recording (CAP image) captured is displayed on the display unit.

Time passes from left to right.

Similarly to FIGS. 5A, 5B, 5C, 5D, 5E, 5F, 5G, and 5H described above, FIGS. 9A, 9B, 9C, 9D, 9E, 9F, 9G, and 9H individually illustrate the processing timings of the following.

FIG. 9A Imaging element input synchronization signal
FIG. 9B Exposure processing of imaging element and output to frame memory
FIG. 9C Stored image of first frame memory (FM1)
FIG. 9D Stored image of second frame memory (FM2)
FIG. 9E Image-capturing operation (release (shutter) operation)
FIG. 9F Processing of control unit
FIG. 9G Display unit input synchronization signal
FIG. 9H Display unit display image Hereinafter, pieces of processing will be sequentially described of processing steps S41 to S49 illustrated in FIGS. 9A, 9B, 9C, 9D, 9E, 9F, 9G, and 9H.

(Step S41)

First, in step S41, as illustrated in the vicinity of the center of the line of the FIG. 9E image-capturing operation (release (shutter) operation) of FIGS. 9A, 9B, 9C, 9D, 9E, 9F, 9G, and 9H, the image-capturing operation by the user, in other words, the pressing processing of the release button (shutter button) is performed.

(Step S42)

When the image-capturing operation by the user, in other words, the pressing processing of the release button (shutter button) is performed in step S41, the control unit 110 starts exposure preparation processing in step S42.

The exposure preparation processing is processing similar to those in the embodiments described above. It is time required for, for example, output processing of control signals to the imaging element 102 and the signal processing unit 105 from the control unit 110, setting processing based on the control signals in the imaging element and the signal processing unit, and the like.

The exposure preparation processing includes, for example, mode switching processing of the imaging element 102.

(Step S43)

When the exposure preparation processing is started in step S42, the control unit 110 further makes preparation request for exposure stop processing and image for recording (CAP image) exposure processing to the imaging element 102 in step S43.

The imaging element 102 starts preparation for the image for recording (CAP image) exposure processing, for example, mode switching processing for changing to output data having a high number of pixels. When this processing is started, the imaging element 102 stops the exposure processing of the image for displaying (LV image) and memory output processing.

In the fourth embodiment, as illustrated in FIGS. 9A, 9B, 9C, 9D, 9E, 9F, 9G, and 9H, the image being in execution of exposure by the imaging element 102 at the time of image-capturing operation execution is an image for displaying (LV5 image), and in the middle of this period of exposure, the imaging element 102 stops the exposure processing of the image for displaying (LV5) and the memory output processing.

(Steps S44 to S45)

In the fourth embodiment, in step S44, the control unit 110 executes processing of copying the latest image for displaying (LV4) stored in the second frame memory (FM2) to the first frame memory (FM1).

The image for displaying (LV) to be copied is the latest image for displaying having been stored in the frame memory 104 at the time of exposure stop in step S43.

In the example illustrated in FIGS. 9A, 9B, 9C, 9D, 9E, 9F, 9G, and 9H, it is the image for displaying (LV4) stored in the second frame memory (FM2).

Processing is executed of copying the latest image for displaying (LV4) to the first frame memory (FM1) that is another frame memory.

As a result of this copy processing, in display processing (step S45) according to the display reservation executed immediately before the image-capturing processing in step S41, in other words, the display reservation for the image for displaying (LV5) to be stored in the first frame memory, display processing of the image for displaying (LV4) is performed on the display unit 107.

In other words, in step S45, the image for displaying (LV4) copied and stored in the first frame memory (FM1) is read from the first frame memory (FM1), output to the display unit 107, and displayed.

As a result, at the time of an imaging element synchronization signal (ta4) illustrated in FIGS. 9A, 9B, 9C, 9D, 9E, 9F, 9G, and 9H, first, the image for displaying (LV4) is read from the first frame memory (FM1) and displayed on the display unit 107. Next, at the time of an imaging element synchronization signal (ta5) illustrated in FIGS. 9A, 9B, 9C, 9D, 9E, 9F, 9G, and 9H, copy data of the image for displaying (LV4) is read from the second frame memory (FM2) and displayed on the display unit 107.

As described above, the image for displaying (LV4) is sequentially read from the two frame memories (FM1, FM2) and continuously displayed on the display unit.

(Step S46)

Thereafter, when the exposure preparation processing is completed, the control unit 110 notifies the imaging element 102 that the exposure preparation processing is completed in step S46, and causes the imaging element 102 to start exposure processing of the image for recording (CAP image).

(Step S47)

In step S47, the imaging element 102 starts the exposure processing of the image for recording (CAP image).

The period of exposure is set corresponding to, for example, a period set by the user, in other words, the shutter speed.

(Steps S48 to S49)

The control unit 110 further executes display reservation of the image for recording (CAP image) in step S48, and executes display processing of the image for recording (CAP image) in step S49.

As understood from the sequence diagram illustrated in FIGS. 9A, 9B, 9C, 9D, 9E, 9F, 9G, and 9H, in the FIG. 9H display unit display image, the image for displaying (LV4) acquired from the second frame memory (FM2) and the image for displaying (LV4) that is the copied image acquired from the first frame memory (FM1) are continuously displayed longer than the original image frame display period, and after the display of the image for displaying (LV4), the image for recording (CAP image) is continuously displayed.

In other words, in the present embodiment, the display processing of the image for displaying (LV4) on the display unit 107 is continued until the image for recording (CAP image) is stored in the frame memory 104 and can be displayed.

When the image for recording (CAP image) is stored in the frame memory 104 and can be displayed, the image for recording (CAP image) is read from the frame memory 104 and displayed on the display unit 107 in steps S48 to S49.

Note that, in the display processing, processing is performed in which thinning processing depending on the number of display pixels of the display unit 107 is performed on the image for recording (CAP image) stored in the second frame memory (FM2) and the thinned image is displayed.

As a result of these pieces of processing, the image for recording (CAP image) is displayed on the display unit 107 continuously to the display processing of the image for displaying (LV4) before the time of image-capturing operation execution.

In other words, the image display is continuously executed on the display unit 107 without causing the blackout.

4. (Fifth Embodiment) Embodiment in which it is Determined Whether or not Period of Exposure of Image for Recording (CAP Image) is Greater than or Equal to Specified Time, and Display Control is Executed Depending on Determination Result Next, as a fifth embodiment, an example will be described in which it is determined whether or not the period of exposure of the image for recording (CAP image) is greater than or equal to a specified time, and display control is executed depending on the determination result.

The fifth embodiment is an embodiment in which, for example, the control unit inputs the period of exposure of the image for recording set by the user (image-capturing person), in other words, the user's shutter speed information defining the period of exposure, and in the control unit, it is determined whether or not the period of exposure of the image for recording (CAP image) is greater than or equal to the specified time, and display control is executed depending on the determination result.

Specifically, in a case where the period of exposure of the image for recording (CAP image) is greater than or equal to the specified time, the blackout is caused on the display unit 107, and after the exposure of the image for recording (CAP image) is completed and the image is stored in the frame memory, a transition is made from the blackout state to the image for recording (CAP image) display.

On the other hand, in a case where the period of exposure of the image for recording (CAP image) is not greater than or equal to the specified time, the processing of any of the first to fourth embodiments described above is executed to execute display processing without the blackout.

In all of the first to fourth embodiments described above, the image for displaying (LV4) or the image for displaying (LV5) is set to be displayed on the display unit 107 longer than the time of the original switching timing of the image for displaying, and when such continuous display of the same image becomes long, the user may misunderstand that the moving image display is switched to the still image display.

An image displayed on the display unit 107 by image-capturing operation is displayed as a still image, and the user (image-capturing person) confirms the captured image by the still image displayed on the display unit.

However, if the image for displaying (LV4) or the image for displaying (LV5), which should originally be displayed as a moving image, is continuously displayed for a long time before that, this still image may be misidentified as a captured image.

To prevent such misidentification processing from occurring, in the fifth embodiment, in a case where the period of exposure of the image for recording (CAP image) is greater than or equal to the specified time, the blackout is caused on the display unit 107, and after the exposure of the image for recording (CAP image) is completed and the image is stored in the frame memory, a transition is made from the blackout state to the image for recording (CAP image) display.

FIGS. 10A, 10B, 10C, 10D, 10E, 10F, 10G, and 10H are timing charts illustrating a processing sequence of the fourth embodiment.

Similarly to FIGS. 5A, 5B, 5C, 5D, 5E, 5F, 5G, and 5H described above, FIGS. 10A, 10B, 10C, 10D, 10E, 10F, 10G, and 10H illustrate the processing sequence in a case where the image for displaying (LV image) is displayed on the display unit of the imaging apparatus, and during the display, image-capturing processing by the user (image-capturing person), in other words, pressing processing of the release button (shutter button) is performed.

In other words, the figure illustrates the processing sequence in a case where the image-capturing processing by the user (image-capturing person) is executed during the period in which the image for displaying (LV image) is displayed on the display unit of the imaging apparatus, and the image for recording (CAP image) captured is displayed on the display unit.

Time passes from left to right.

Similarly to FIGS. 5A, 5B, 5C, 5D, 5E, 5F, 5G, and 5H described above, FIGS. 10A, 10B, 10C, 10D, 10E, 10F, 10G, and 10H individually illustrate the processing timings of the following.

FIG. 10A Imaging element input synchronization signal
FIG. 10B Exposure processing of imaging element and output to frame memory
FIG. 10C Stored image of first frame memory (FM1)
FIG. 10D Stored image of second frame memory (FM2)
FIG. 10E Image-capturing operation (release (shutter) operation)
FIG. 10F Processing of control unit
FIG. 10G Display unit input synchronization signal
FIG. 10H Display unit display image Hereinafter, pieces of processing will be sequentially described of processing steps S51 to S58 illustrated in FIGS. 10A, 10B, 10C, 10D, 10E, 10F, 10G, and 10H.

(Step S51)

First, in step S51, as illustrated in the vicinity of the center of the line of the FIG. 10E image-capturing operation (release (shutter) operation) of FIGS. 10A, 10B, 10C, 10D, 10E, 10F, 10G, and 10H, the image-capturing operation by the user, in other words, the pressing processing of the release button (shutter button) is performed.

(Step S52)

When the image-capturing operation by the user, in other words, the pressing processing of the release button (shutter button) is performed in step S51, the control unit 110 starts exposure preparation processing in step S52.

The exposure preparation processing is processing similar to those in the embodiments described above. It is time required for, for example, output processing of control signals to the imaging element 102 and the signal processing unit 105 from the control unit 110, setting processing based on the control signals in the imaging element and the signal processing unit, and the like.

The exposure preparation processing includes, for example, mode switching processing of the imaging element 102.

(Step S53)

When the exposure preparation processing is started in step S52, the control unit 110 further makes preparation request for exposure stop processing and image for recording (CAP image) exposure processing to the imaging element 102 in step S53.

The imaging element 102 starts preparation for the image for recording (CAP image) exposure processing, for example, mode switching processing for changing to output data having a high number of pixels. When this processing is started, the imaging element 102 stops the exposure processing of the image for displaying (LV image) and memory output processing.

In the fifth embodiment, as illustrated in FIGS. 10A, 10B, 10C, 10D, 10E, 10F, 10G, and 10H, the image being in execution of exposure by the imaging element 102 at the time of image-capturing operation execution is an image for displaying (LV5 image), and in the middle of this period of exposure, the imaging element 102 stops the exposure processing of the image for displaying (LV5) and the memory output processing.

(Step S54)

In the fifth embodiment, in step S54, the control unit 110 determines whether or not the period of exposure of the image for recording (CAP image) is greater than or equal to the specified time, and in a case where it is determined that the exposure time is greater than or equal to the specified time, makes a blackout processing request to the display unit 107.

Note that, the period of exposure of the image for recording (CAP image) is determined by inputting image-capturing setting information of the user (image-capturing person), specifically, the shutter speed. The specified time is a preset time and is stored in the memory.

Note that, in a case where it is determined that the period of exposure of the image for recording (CAP image) is not greater than or equal to the specified time, the blackout processing request to the display unit 107 is not made, and the processing of any of the first to fourth embodiments described above is executed.

(Step S55)

Thereafter, when the exposure preparation processing is completed, the control unit 110 notifies the imaging element 102 that the exposure preparation processing is completed in step S55, and causes the imaging element 102 to start exposure processing of the image for recording (CAP image).

(Step S56)

In step S56, the imaging element 102 starts the exposure processing of the image for recording (CAP image).

The period of exposure is set corresponding to, for example, a period set by the user, in other words, the shutter speed.

(Steps S57 to S58)

The control unit 110 further executes display reservation of the image for recording (CAP image) in step S57, and executes display processing of the image for recording (CAP image) in step S58.

As understood from the sequence diagram illustrated in FIGS. 10A, 10B, 10C, 10D, 10E, 10F, 10G, and 10H, the FIG. 10H display unit display image is caused to black out after a display period of the image for displaying (LV4) acquired from the second frame memory (FM2), and thereafter, when the image for recording (CAP image) is stored in the frame memory 104 and can be displayed, the image for recording (CAP image) is read from the frame memory 104 and displayed on the display unit 107 in steps S57 to S58.

Note that, in the display processing, processing is performed in which thinning processing depending on the number of display pixels of the display unit 107 is performed on the image for recording (CAP image) stored in the second frame memory (FM2) and the thinned image is displayed.

Note that, the blackout processing is executed only in a case where it is determined in step S54 that the period of exposure of the image for recording (CAP image) is greater than or equal to the specified time.

In a case where it is determined that the period of exposure of the image for recording (CAP image) is not greater than or equal to the specified time, the blackout processing request to the display unit 107 is not made, and the processing is executed of any of the first to fourth embodiments described above.

As a result of these pieces of processing, the blackout of the display unit 107 can be caused only in a case where the period of exposure of the image for recording (CAP image) is greater than or equal to the specified time.

With this processing, in a case where the period of exposure of the image for recording (CAP image) is greater than or equal to the specified time, the image for displaying (LV image) is displayed as a still image for a long time, and the misidentification processing can be avoided such as the user's (image-capturing person's) misunderstanding that the display image is the captured image.

Note that, regarding the present embodiment, a processing example has been described in which two frame memories are included; however, in the present embodiment, a similar effect can be obtained in a configuration in which captured images are sequentially stored in one frame memory.

5. Sequence of Processing Executed by Imaging Apparatus

Next, an image display control sequence executed by the control unit of the imaging apparatus will be described with reference to a flowchart illustrated in FIG. 11.

Figure 11:
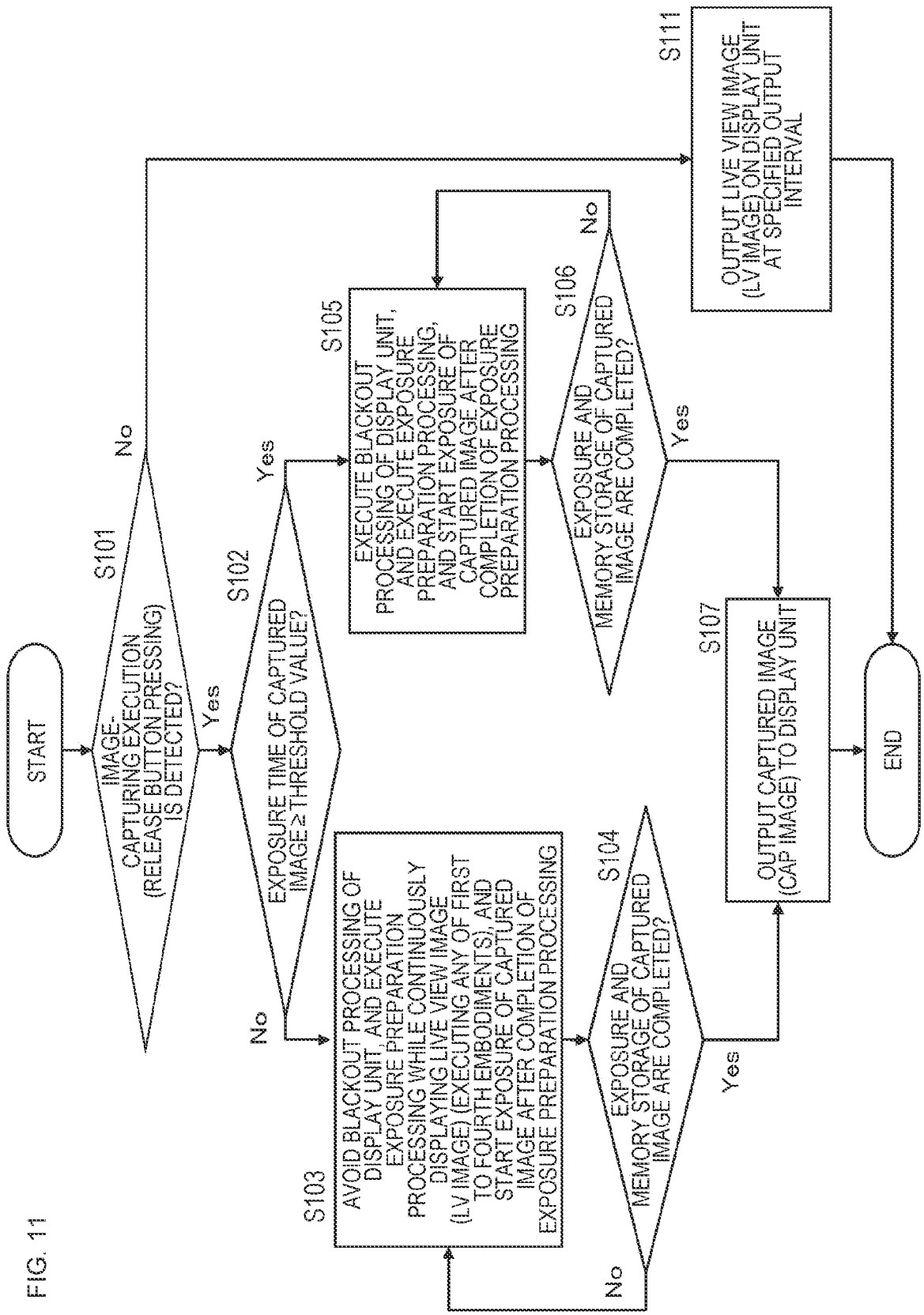
FIG. 11 is a flowchart illustrating a processing sequence executed by the imaging apparatus.

The flow illustrated in FIG. 11 is a flow illustrating an image display control sequence corresponding to the processing according to the fifth embodiment described above with reference to FIGS. 10A, 10B, 10C, 10D, 10E, 10F, 10G, and 10H.

In other words, it is a flow describing the image display control sequence in the case of a setting in which, in a case where it is determined that the period of exposure of the image for recording (CAP image) is greater than or equal to the specified time, the blackout processing is performed, and in a case where the period of exposure of the image for recording (CAP image) is not greater than or equal to the specified time, the blackout processing is not performed and the processing of any of the first to fourth embodiments described above is executed.

The flow illustrated in FIG. 11 is executed in accordance with a program stored in advance in, for example, the storage unit of the imaging apparatus 100 under the control of the control unit 110 including a processor having a program execution function.

Hereinafter, processing of each step will be described sequentially.

(Step S101)

First, in step S101, the control unit 110 of the imaging apparatus 100 determines whether or not image-capturing processing is executed, in other words, whether or not the release button is pressed by the user (image-capturing person). This is performed as input detection processing from the operation unit 109 in the control unit 110.

In a case where it is determined that the image-capturing processing (release button pressing) is executed, the processing proceeds to step S102, and in a case where it is determined that the image-capturing processing (release button pressing) is not executed, the processing proceeds to step S111.

(Step S111)

First, processing will be described in a case where it is determined in step S101 that the image-capturing processing (release button pressing) is not executed.

In a case where it is determined in step S101 that the image-capturing processing (release button pressing) is not executed, the processing proceeds to step S111, and the control unit 110 performs switching of the display image frame at a predefined interval to perform display processing of the image for displaying (LV image).

(Step S102)

In a case where it is determined in step S101 that the image-capturing processing (release button pressing) is executed, the processing proceeds to step S102, and the control unit 110 determines in step S102 whether or not the period of exposure of the image for recording (CAP image) corresponding to the image-capturing operation detected in step S101 is greater than or equal to a threshold value (specified time).

Note that, as described above, the period of exposure of the image for recording (CAP image) is determined by inputting the image-capturing setting information of the user (image-capturing person), specifically the shutter speed. The threshold value (specified time) is a preset time and is stored in the memory.

In a case where it is determined in step S102 that the period of exposure is not greater than or equal to the threshold value (specified time), the processing proceeds to step S103, and in a case where it is determined that the period of exposure is equal to or greater than the threshold value (specified time), the processing proceeds to step S105.

(Step S103)

In a case where it is determined in step S102 that the period of exposure is not greater than or equal to the threshold value (specified time), the processing proceeds to step S103.

In this case, the control unit 110 executes the processing in which the blackout of the display unit 107 is avoided, specifically, the processing of any of the first to fourth embodiments described above, and executes the exposure preparation processing, and after completion of the exposure preparation processing, starts exposure of a captured image (image for recording (CAP image)).

Here, the processing is executed of any of the first to fourth embodiments described above, in other words, display control is executed according to any of the following embodiments in which the blackout of the display unit is prevented.

The following embodiments will be sequentially described.

(First embodiment) Embodiment in which blackout of display unit is prevented by starting exposure preparation processing after completion of exposure of image for displaying (Second embodiment) Embodiment in which blackout of display unit is prevented by starting exposure preparation processing after lapse of waiting time for making release time lag constant after completion of exposure of image for displaying (Third embodiment) Embodiment in which blackout of display unit is prevented by canceling display reservation of unexposed image and performing continuous display of display image of display unit (Fourth embodiment) Embodiment in which blackout of display unit is prevented by continuously displaying the same image on display unit even after memory switching, by performing inter frame memory copy of latest image having been stored in frame memory By executing any of these pieces of processing, image display is continuously performed on the display unit 107, and image display that does not cause the blackout is performed.

(Step S104)

In step S103, when the exposure preparation processing is completed and the exposure of the captured image (image for recording (CAP image)) is started, next, it is determined in step S104 whether or not the exposure processing and storage processing in the frame memory 104 of the captured image (image for recording (CAP image)) is completed.

In a case where it is determined that the processing is completed, the processing proceeds to step S107.

(Step S107)

In step S107, the captured image (image for recording (CAP image)) stored in the frame memory 104 is read and displayed on the display unit 107.

In a case where the processing in steps S103 to S104 to S107 is performed, the display unit 107 displays the image for displaying (LV image) and then the captured image (image for recording (CAP image)) without causing the blackout.

(Step S105)

Next, processing will be described in step S105 and subsequent steps in a case where it is determined in step S102 that the period of exposure is greater than or equal to the threshold value (specified time).

In this case, in step S105, the control unit 110 executes the blackout processing of the display unit 107 and starts exposure preparation processing, and after completion of the exposure preparation processing, starts exposure of the captured image (image for recording (CAP image)).

This is the processing with the blackout of the fifth embodiment described above with reference to FIGS. 10A, 10B, 10C, 10D, 10E, 10F, 10G, and 10H. This processing is executed only in a case where the period of exposure of the captured image (image for recording (CAP image)) is greater than or equal to the specified time.

If the processing of the first to fourth embodiments is performed in a case where the period of exposure of the captured image (image for recording (CAP image)) is long, the image for displaying (LV image) is displayed as a still image for a long time, and misidentification processing may occur such as the user's (image-capturing person's) misunderstanding that the display image is the captured image, and one of the reasons for performing the blackout is to avoid this.

(Step S106)

In step S105, when the exposure preparation processing is completed and the exposure of the captured image (image for recording (CAP image)) is started, next, it is determined in step S106 whether or not the exposure processing and storage processing in the frame memory 104 of the captured image (image for recording (CAP image)) is completed.

In a case where it is determined that the processing is completed, the processing proceeds to step S107.

(Step S107)

In step S107, the captured image (image for recording (CAP image)) stored in the frame memory 104 is read and displayed on the display unit 107.

In a case where the processing in steps S105 to S106 to S107 is performed, the display unit 107 stops displaying the image for displaying (LV image) and causes the blackout, and then displays the captured image (image for recording (CAP image)).

6. Other Embodiments

Next, other embodiments will be described.

An example has been described above of the imaging apparatus that executes the processing of the present disclosure with reference to FIG. 4.

The processing of the present disclosure is also applicable to an imaging apparatus having a configuration different from the configuration of the imaging apparatus 100 illustrated in FIG. 4.

FIG. 12 illustrates a configuration example of an imaging apparatus 200 having a configuration different from the configuration illustrated in FIG. 4 enabled to execute the processing of the present disclosure.

The imaging apparatus 200 illustrated in FIG. 12 includes an optical lens 101, an imaging element device 210, a signal processing unit (signal processing LSI) 105, a memory 106, a display unit (LCD/EVF) 107, a recording unit 108, an operation unit 109, and a control unit 110.

The configuration other than the imaging element device 210 is similar to the configuration described above with reference to FIG. 4.

The imaging element device 210 of the imaging apparatus 200 illustrated in FIG. 12 includes an imaging element 211, an AD conversion unit 212, and a frame memory 213.

Light incident through the optical lens 101 is incident on the imaging element 211 of the imaging element device 210, for example, the imaging element 211 including a CMOS image sensor or the like, and the imaging element 211 outputs image data obtained by photoelectric conversion to the AD conversion unit 212 included in the imaging device 210.

The AD conversion unit 212 in the imaging device 210 executes A/D conversion of an input signal, in other words, processing of converting an analog signal into a digital signal, and stores a digital value after conversion in the frame memory 213 included in the same imaging device 210.

The frame memory 213 is enabled to store two image frames, and includes a first frame memory (FM1) 251 and a second frame memory (FM2) 252. Images are alternately stored in these two frame memories.

Image data are output from the two frame memories to the signal processing unit (signal processing LSI) 105 in the image-capturing order.

The signal processing unit (signal processing LSI) 105 inputs the image data from the frame memory 213 and performs signal processing.

Subsequent processing is the processing similar to the processing of the imaging apparatus 100 described above with reference to FIG. 4.

The imaging apparatus 200 illustrated in FIG. 12 is characterized in that the imaging device 210 including the imaging element 211, the AD conversion unit 212, and the frame memory 213 is included.

A control signal and a synchronization signal are input from the control unit 110 to the imaging device 210, and update processing is performed, such as start, change, and end of processing, on the basis of the synchronization signal.

Also in the configuration illustrated in FIG. 12, the processing can be performed according to the timing charts and flowcharts of FIGS. 5A, 5B, 5C, 5D, 5E, 5F, 5G, 5H, 6A, 6B, 6C, 6D, 6E, 6F, 6G, 6H, 7A, 7B, 7C, 7D, 7E, 7F, 7G, 7H, 8A, 8B, 8C, 8D, 8E, 8F, 8G, 8H, 9A, 9B, 9C, 9D, 9E, 9F, 9G, 9H, 10A, 10B, 10C, 10D, 10E, 10F, 10G, 10H, and 11 described above.

7. Summary of Configuration of Present Disclosure

In the above, the embodiments of the present disclosure have been described in detail with reference to specific embodiments. However, it is self-evident that those skilled in the art can make modifications and substitutions of the embodiments without departing from the gist of the present disclosure. In other words, the present invention has been disclosed in the form of exemplification, and should not be interpreted restrictively. To determine the gist of the present disclosure, the scope of claims should be taken into consideration.

Note that, the technology disclosed in this specification can have the following configuration.

(1) An imaging apparatus including:

an imaging element;

a frame memory that stores an image for displaying acquired by the imaging element;

a display unit that displays the image for displaying stored by the frame memory; and a control unit that starts exposure preparation processing of an image for recording in response to input detection of imaging operation, and performs display control to cause the display unit to display the image for displaying having been stored in the frame memory unit until display of the image for recording is enabled.

(2) The imaging apparatus according to (1), in which the control unit executes exposure processing of the image for recording in the imaging element and storage processing of the image for recording acquired by the exposure processing in the frame memory, after completion of the exposure preparation processing of the image for recording.

(3) The imaging apparatus according to (2), in which
the control unit
switches a display image of the display unit to display the image for recording from the image for displaying, after an end of the exposure processing of the image for recording and the storage processing of the image for recording in the frame memory.

(4) The imaging apparatus according to any of (1) to (3), in which
the control unit
starts the exposure preparation processing of the image for recording at a time of input detection of the image-capturing operation, and stops exposure processing in the imaging element of the image for displaying.

(5) The imaging apparatus according to any of (1) to (4), in which
the control unit
executes waiting processing of waiting for a time required to complete exposure of the image for displaying being exposed in the imaging element at a time of input detection of the image-capturing operation, and starts the exposure preparation processing of the image for recording after completion of waiting, and
performs display control to display, on the display unit, the image for displaying having been exposed during the waiting processing and having been stored in the frame memory until the display of the image for recording is enabled.

(6) The imaging apparatus according to any of (1) to (5), in which
the control unit
executes waiting processing of waiting for a time required to complete exposure processing of one image frame for displaying from a time of input detection of the image-capturing operation, and starts the exposure preparation processing of the image for recording after the waiting processing, and
performs display control to cause the display unit to display the image for displaying having been exposed during the waiting processing and having been stored in the frame memory until the display of the image for recording is enabled.

(7) The imaging apparatus according to any of (1) to (6), in which
the control unit
performs processing of canceling latest display reservation processing having been executed before input of the image-capturing operation, in response to input detection of the image-capturing operation, and
performs display control to avoid a blackout of the display unit, by continuing display processing of an image for displaying on the display unit executed corresponding to display reservation processing before display reservation processing to be cancelled, until the display of the image for recording is enabled.

(8) The imaging apparatus according to any of (1) to (7), in which
the frame memory includes two frame memories enabled to store two image frames, and
the control unit
executes processing of copying and storing a latest image for displaying stored in one of the two frame memories in the other frame memory, in response to input detection of the image-capturing operation, and
performs display control to avoid a blackout of the display unit, by alternately reading an identical image for displaying from the two frame memories and displaying the image for displaying on the display unit, until the display of the image for recording is enabled.

(9) The imaging apparatus according to any of (1) to (8), in which
the control unit
determines whether or not a period of exposure executed in the imaging element in response to the image-capturing operation is greater than or equal to a threshold value set in advance, and
performs display control to avoid a blackout of the display unit in a case where it is determined that the period of exposure is not greater than or equal to the threshold value.

(10) The imaging apparatus according to any of (1) to (9), in which
the control unit
determines whether or not the period of exposure executed in the imaging element in response to the image-capturing operation is greater than or equal to the threshold value set in advance, and
performs display control to cause a blackout on the display unit without avoiding the blackout in a case where it is determined that the period of exposure is greater than or equal to the threshold value.

(11) The imaging apparatus according to (10), in which
the control unit
switches the display unit to display the image for recording from a blackout state, after an end of exposure processing and frame memory storage processing of the image for recording.

(12) The imaging apparatus according to any of (1) to (11), in which
the imaging element is included in an imaging device including as a constituent element
an AD conversion unit that executes AD conversion processing on an output signal of the imaging element, and
a frame memory that stores a digital signal generated by the AD conversion unit.

(13) An image processing method to be executed in an imaging apparatus,
the imaging apparatus including
an imaging element,
a frame memory that stores an acquired image by the imaging element,
a display unit that displays a stored image of the frame memory, and
a control unit that performs control of processing to be executed in the imaging apparatus,
the image processing method including,
by the control unit, starting exposure preparation processing of an image for recording in response to input detection of image-capturing operation, and performing display control to cause the display unit to display an image for displaying having been stored in the frame memory unit until display of the image for recording is enabled.

(14) A program that causes an imaging apparatus to execute image processing,
the imaging apparatus including
an imaging element,
a frame memory that stores an acquired image by the imaging element,
a display unit that displays a stored image of the frame memory, and a control unit that performs control of processing to be executed in the imaging apparatus, the program causing the control unit to start exposure preparation processing of an image for recording in response to input detection of imaging operation, and perform display control to cause the display unit to display the image for displaying having been stored in the frame memory until display of the image for recording is enabled.

Furthermore, the series of processing steps described in the specification can be executed by hardware, software, or a combination of both. In the case of executing processing by software, it is possible to install and execute a program recording the processing sequence in a memory in a computer incorporated in dedicated hardware, or to install and execute the program in a general-purpose computer capable of executing various types of processing. For example, the program can be recorded in a recording medium in advance. In addition to installing from the recording medium to the computer, the program can be received via a network such as a local area network (LAN) or the Internet, and installed in the recording medium such as a built-in hard disk.

Note that, the various types of processing described in the specification are not only executed in chronological order in accordance with the description but also may be executed in parallel or individually depending on the processing capability of the device that executes the processing or depending on necessity. Furthermore, in this specification, the term "system" is a logical group configuration of a plurality of devices, and is not limited to the one in which the devices of each configuration are in the same housing.

INDUSTRIAL APPLICABILITY

As described above, according to the configuration of the embodiment of the present disclosure, the apparatus and the method are implemented that perform display control to avoid the blackout of the display unit at the time of capturing an image for recording.

Specifically, for example, the apparatus includes an imaging element, a frame memory, a display unit, and a control unit, and the control unit starts exposure preparation processing of an image for recording in response to input detection of image-capturing operation on the imaging apparatus, and executes exposure processing of the image for recording in the imaging element and storage processing of the image for recording in the frame memory after completion of the exposure preparation processing. Moreover, the control unit stops exposure of an image for displaying of the imaging element with the start of the exposure preparation processing, and displays the image for displaying on the display unit until display of the image for recording is enabled, to avoid the blackout.

With these pieces of processing, the apparatus and the method are implemented that perform display control to avoid the blackout of the display unit at the time of capturing the image for recording.

REFERENCE SIGNS LIST

11 Optical lens
12 Imaging element
13 AD conversion unit
14 Frame memory
15 Signal processing unit
16 Memory
21 Display unit
22 Recording unit
101 Optical lens
102 Imaging element
103 AD conversion unit
104 Frame memory
105 Signal processing unit
106 Memory
107 Display unit
108 Recording unit
109 Operation unit
110 Control unit
121 First frame memory (FM1)
122 Second frame memory (FM2)
200 Imaging apparatus
210 Imaging device
211 Imaging element
212 AD conversion unit
213 Frame memory
251 First frame memory (FM1)
252 Second frame memory (FM2)

The invention claimed is:

1. An imaging apparatus, comprising:
an imaging element configured to acquire a first live view image;
a first frame memory configured to store the first live view image acquired by the imaging element;
a display unit configured to display the first live view image stored by the first frame memory; and
a control unit configured to:
start an exposure process for a second live view image in the imaging element;
execute a display reservation process for the second live view image;
detect an input of an image-capturing operation, wherein the first live view image is displayed at a time of the detection of the input of the image-capturing operation;
start an exposure preparation process of a capture image based on the detection of the input of the image-capturing operation;
stop the exposure process for the second live view image based on the start of the exposure preparation process of the capture image;
cancel the display reservation process for the second live view image based on the start of the exposure preparation process of the capture image; and
control the display unit to continuously display the first live view image on the display unit, wherein the first live view image is continuously displayed until enablement of display of the capture image.

2. The imaging apparatus according to claim 1, wherein the control unit is further configured to execute an exposure process of the capture image in the imaging element after completion of the exposure preparation process of the capture image.

3. The imaging apparatus according to claim 1, further comprising a second frame memory, wherein
the imaging element is further configured to acquire a plurality of live view images,
the plurality of live view images includes the first live view image and the second live view image, and
the plurality of live view images is alternately stored in the first frame memory and the second frame memory.

4. The imaging apparatus according to claim 3, wherein the control unit is further configured to:

copy the first live view image;
store, based on the detection of the input of the image-capturing operation, the copied first live view image in the second frame memory; and
control the display unit to continuously display the copied first live view image on the display unit.

5. The imaging apparatus according to claim 2, wherein the control unit is further configured to store the capture image in the first frame memory based on the execution of the exposure process of the capture image.

6. The imaging apparatus according to claim 5, wherein the control unit is further configured to switch a display image of the display unit from the first live view image to the capture image based on the storage of the capture image in the first frame memory.

7. The imaging apparatus according to claim 1, wherein the control unit is further configured to:
determine, based on the detection of the input of the image-capturing operation, a period of exposure of the capture image in the imaging element is one of less than a threshold value, or greater than or equal to the threshold value; and
execute, based on the determination that the period of exposure is less than the threshold value, display control to avoid a blackout of the display unit.

8. The imaging apparatus according to claim 1, further comprising an imaging device that includes:
the imaging element configured to further output a signal;
an analog/digital (AD) conversion unit configured to:
execute an AD conversion process on the signal of the imaging element; and
generate a digital signal based on the AD conversion process; and
the first frame memory configured to further store the digital signal generated by the AD conversion unit.

9. An image processing method, comprising:
in an imaging apparatus:
acquiring, by an imaging element of the imaging apparatus, a first live view image;
storing, by a frame memory of the imaging apparatus, the first live view image acquired by the imaging element;
displaying, by a display unit of the imaging apparatus, the first live view image stored by the frame memory;
starting, by a control unit of the imaging apparatus, an exposure process for a second live view image in the imaging element;
executing, by the control unit, a display reservation process for the second live view image;
detecting, by the control unit, an input of an image-capturing operation, wherein the first live view image is displayed at a time of the detection of the input of the image-capturing operation;
starting, by the control unit, an exposure preparation process of a capture image based on the detection of the input of the image-capturing operation;
stopping, by the control unit, the exposure process for the second live view image based on the start of the exposure preparation process of the capture image;
canceling, by the control unit, the display reservation process for the second live view image based on the start of the exposure preparation process of the capture image; and
controlling, by the control unit, the display unit to continuously display the first live view image on the display unit, wherein the first live view image is continuously displayed until enablement of display of the capture image.

10. A non-transitory computer-readable medium having stored thereon computer-executable instructions which, when executed by an imaging apparatus, cause the imaging apparatus to execute operations, the operations comprising:
acquiring, by an imaging element of the imaging apparatus, a first live view image;
storing, by a frame memory of the imaging apparatus, the first live view image acquired by the imaging element;
displaying, by a display unit of the imaging apparatus, the first live view image stored by the frame memory;
starting, by a control unit of the imaging apparatus, an exposure process for a second live view image in the imaging element;
executing, by the control unit, a display reservation process for the second live view image;
detecting, by the control unit, an input of an image-capturing operation, wherein the first live view image is displayed at a time of the detection of the input of the image-capturing operation;
starting, by the control unit, an exposure preparation process of a capture image based on the detection of the input of the image-capturing operation;
stopping, by the control unit, the exposure process for the second live view image based on the start of the exposure preparation process of the capture image;
canceling, by the control unit, the display reservation process for the second live view image based on the start of the exposure preparation process of the capture image; and
controlling, by the control unit, the display unit to continuously display the first live view image on the display unit, wherein the first live view image is continuously displayed until enablement of display of the capture image.

* * * * *